United States Patent
Lee et al.

(10) Patent No.: US 12,082,232 B2
(45) Date of Patent: Sep. 3, 2024

(54) METHOD AND APPARATUS FOR SCHEDULING TRANSMISSION RESOURCE FOR FULL-DUPLEX WIRELESS COMMUNICATION SYSTEM

(71) Applicants: Samsung Electronics Co., Ltd., Suwon-si (KR); Research & Business Foundation Sungkyunkwan University, Suwon-si (KR)

(72) Inventors: Kwonjong Lee, Suwon-si (KR); Sang-Hyo Kim, Suwon-si (KR); Hyojin Lee, Suwon-si (KR); Min Young Chung, Suwon-si (KR); Dong Hyun Kong, Suwon-si (KR); Yong-Sung Kil, Suwon-si (KR); Seungil Park, Suwon-si (KR); Seunghyun Lee, Suwon-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 329 days.

(21) Appl. No.: 17/524,672

(22) Filed: Nov. 11, 2021

(65) Prior Publication Data
US 2022/0150911 A1    May 12, 2022

(30) Foreign Application Priority Data
Nov. 12, 2020   (KR) .................. 10-2020-0150880

(51) Int. Cl.
*H04W 72/542*   (2023.01)
*H04L 5/14*     (2006.01)
(Continued)

(52) U.S. Cl.
CPC ......... *H04W 72/542* (2023.01); *H04L 5/1461* (2013.01); *H04L 41/12* (2013.01); *H04W 72/23* (2023.01)

(58) Field of Classification Search
CPC ... H04W 72/542; H04W 72/23; H04W 28/16; H04W 72/535; H04W 72/541;
(Continued)

(56) References Cited

U.S. PATENT DOCUMENTS

2009/0147706 A1    6/2009   Yu et al.
2009/0180404 A1*   7/2009   Jung .................... H04L 25/025
                                                         370/279
(Continued)

FOREIGN PATENT DOCUMENTS

| KR | 10-2009-0052773 A | 5/2009 |
| KR | 10-2009-0078157 A | 7/2009 |
| KR | 10-2021-0012303 A | 2/2021 |

OTHER PUBLICATIONS

IEEE: Dynamic Spectrum Sharing in 5G Wireless Networks With Full-Duplex Technology: Recent Advances and Research Challenges—Shree Krishna Sharma et al. IEEE 2017 (Year: 2017).*

*Primary Examiner* — Mohammed S Chowdhury

(57) ABSTRACT

The disclosure relates to a 5G or 6G communication system for supporting a higher data transmission rate than a 4G communication system such as LTE. The disclosure relates to a method and an apparatus for enhancement of self-interference channel estimation performance to secure self-interference removal performance in full-duplex (FD) communication and, more specifically, to a method and an apparatus for scheduling a transmission resource for enhanced self-interference channel estimation in the FD communication.

18 Claims, 33 Drawing Sheets

(51) Int. Cl.
*H04L 41/12* (2022.01)
*H04W 72/23* (2023.01)

(58) Field of Classification Search
CPC ... H04W 84/047; H04W 88/08; H04W 72/54; H04L 5/1461; H04L 41/12
See application file for complete search history.

(56) References Cited

U.S. PATENT DOCUMENTS

| | | | |
|---|---|---|---|
| 2015/0382375 A1* | 12/2015 | Bhushan | H04W 52/243 370/252 |
| 2020/0052775 A1* | 2/2020 | Nam | H04L 5/14 |
| 2021/0028814 A1 | 1/2021 | Lee et al. | |
| 2021/0120555 A1* | 4/2021 | Badic | H04W 72/12 |
| 2021/0136777 A1* | 5/2021 | Lou | H04B 17/309 |

* cited by examiner

FIG. 2
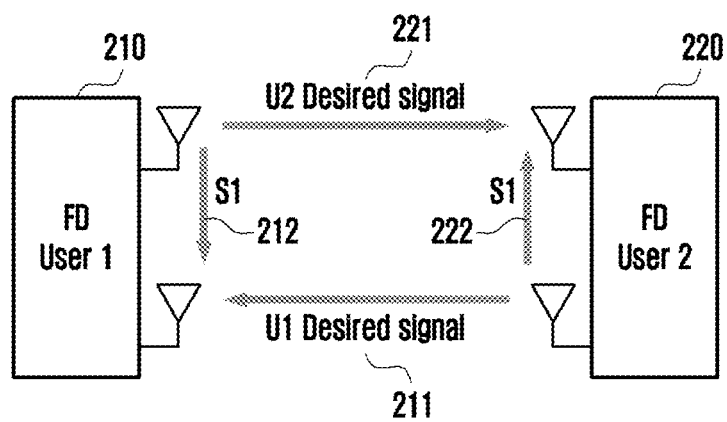
(a)
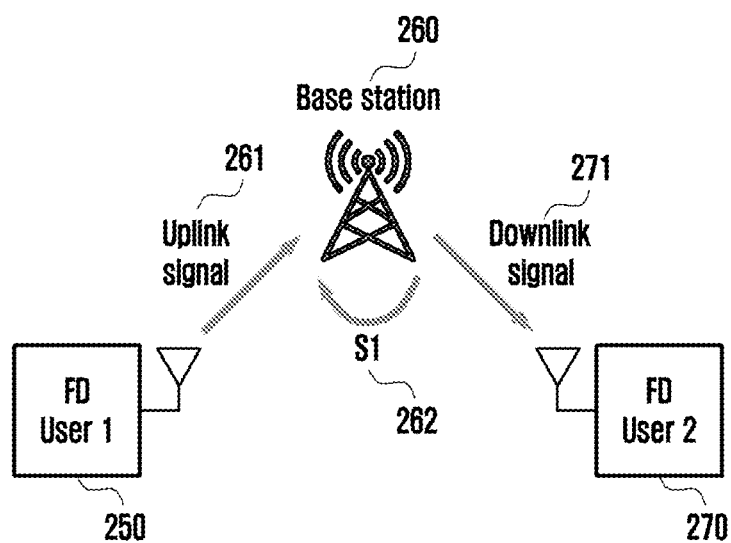
(b)

METHOD AND APPARATUS FOR SCHEDULING TRANSMISSION RESOURCE FOR FULL-DUPLEX WIRELESS COMMUNICATION SYSTEM

CROSS-REFERENCE TO RELATED APPLICATION

This application is based on and claims priority under 35 U.S.C. § 119 to Korean Patent Application No. 10-2020-0150880, filed on Nov. 12, 2020, in the Korean Intellectual Property Office, the disclosure of which is herein incorporated by reference in its entirety.

BACKGROUND

1. Field

The present disclosure relates to a method and an apparatus for scheduling a transmission resource for enhancement of self-interference channel estimation performance for multiple terminals in a full-duplex network environment.

2. Description of Related Art

A review of the development of mobile communication from generation to generation shows that the development has mostly been directed to technologies for services targeting humans, such as voice-based services, multimedia services, and data services. It is expected that connected devices which are exponentially increasing after commercialization of 5G communication systems may be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as Beyond-5G systems.

6G communication systems, which are expected to be implemented approximately by 2030, may have a maximum transmission rate of tera (1,000 giga)-level bps and a radio latency of 100 μsec, and thus may be 50 times as fast as 5G communication systems and have the ¹/₁₀ radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) may become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems may enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response may be provided through 6G communication systems, and thus these services may be applied to various fields including industrial, medical, automobile, and home appliance fields.

In a full-duplex (FD) communication system for frequency efficiency enhancement, transmission and reception are simultaneously performed in the same frequency band, and thus a transmission signal may cause interference in a reception signal. Accordingly, various discussions are being undertaken for a scheme for removing the interference.

The above information is presented as background information only to assist with an understanding of the disclosure. No determination has been made, and no assertion is made, as to whether any of the above might be applicable as prior art with regard to the disclosure.

SUMMARY

The present disclosure provides a method and an apparatus for enhancing self-interference channel estimation performance in order to secure self-interference elimination performance in full-duplex (FD) communication. More specifically, the present disclosure provides a transmission resource scheduling method for enhanced self-interference channel estimation in the FD communication.

According to an embodiment of the disclosure, a method performed by a central node in a full-duplex (FD) communication system may include: identifying a topology of a network supported by the central node and multiple nodes included in the topology; determining yield intervals of the multiple nodes according to the topology; and transmitting scheduling information generated according to the determined yield intervals to the multiple nodes, wherein each of the yield intervals corresponds to an interval in which a specific node among the multiple nodes transmits a signal having a strength less than a threshold value so that another node for receiving the signal from the specific node estimates a self-interference channel.

According to an embodiment of the disclosure, yield intervals of two nodes in a relationship of transmitting or receiving a signal, among the multiple nodes, may not overlap with each other.

In addition, the yield intervals of the multiple nodes may be configured to be consecutive from a foremost position of a scheduled frame.

According to another embodiment of the disclosure, when the network corresponds to a cellular network, a yield interval of the central node may be configured with a sum of yield intervals of nodes remaining after excluding a node for transmitting a signal to the central node from the multiple nodes, and a yield interval of the node for transmitting the signal to the central node may not overlap with the yield interval of the central node.

In addition, the yield interval of the central node may be configured from a foremost position of a scheduled frame, and the yield interval of the node for transmitting the signal to the central node and the yield interval of the central node may be configured to be consecutive.

According to an embodiment of the disclosure, a length of the yield interval may have a value of a predetermined constant.

According to another embodiment of the disclosure, the method may include receiving communication environment information from the multiple nodes, wherein a length and a position of each of the yield intervals are determined using the communication environment information.

In addition, the communication environment information may include at least one of information on a transmission device and a reception device for FD communication of a second communication device, external interference power, self-interference power, and reception signal power.

According to an embodiment of the disclosure, when the network includes multiple topologies, scheduling information of multiple nodes included in each of the multiple topologies may be determined according to each of the multiple topologies.

According to an embodiment of the disclosure, the central node may correspond to a base station, and each of the multiple nodes may correspond to a terminal or an integrated access and backhaul (IAB) node.

A central node in a full-duplex (FD) communication system according to an embodiment of the disclosure may include: a transceiver configured to transmit or receive a signal; and a controller connected to the transceiver, wherein the controller is configured to: identify a topology of a network supported by the central node and multiple nodes included in the topology; determine yield intervals of the multiple nodes according to the topology; and transmit scheduling information generated according to the determined yield intervals to the multiple nodes, wherein each of the yield intervals corresponds to an interval in which a specific node among the multiple nodes transmits a signal having a strength less than a threshold value so that another node for receiving the signal from the specific node estimates a self-interference channel.

According to the disclosure, yield intervals for self-interference channel estimation are configured for multiple terminals and channel estimation is performed in the configured yield intervals, whereby self-interference cancellation (SIC) can be elaborately performed in each terminal and communication performance can thus be enhanced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates an FD P2P communication environment and an FD base station communication environment;

DETAILED DESCRIPTION

Figure 1:
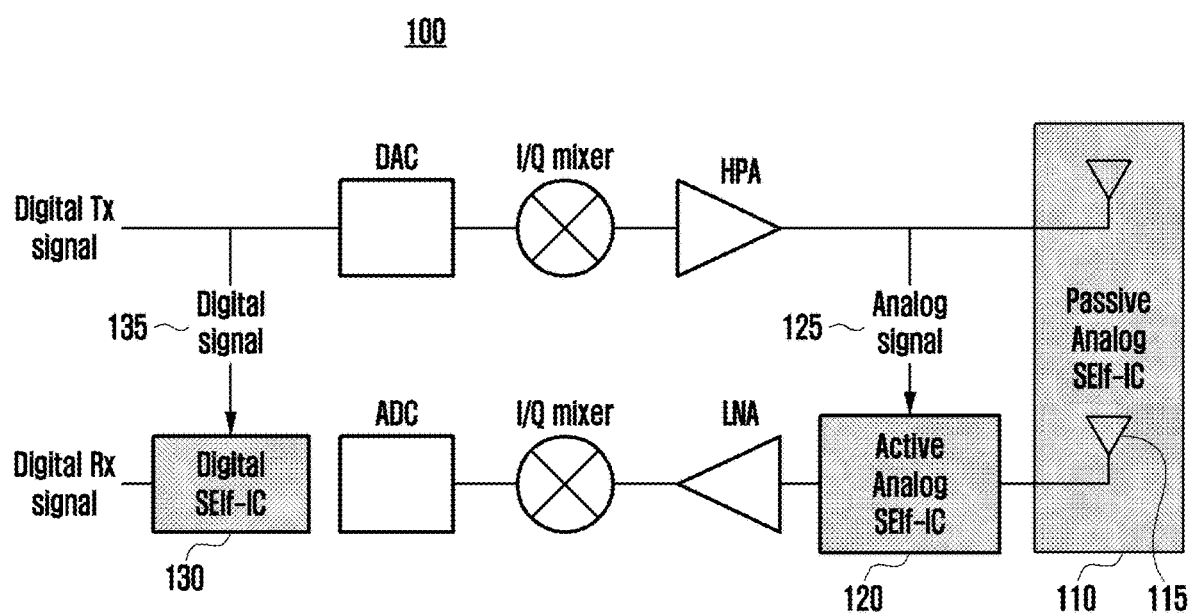
FIG. 1 illustrates a structure of a full-duplex (FD) communication device according to an embodiment of the disclosure.

FIGS. 1 through 33, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card.

Hereinafter, embodiments of the disclosure will be described in detail with reference to the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

With the increase of services requiring high-speed data transmission and the development of the Internet of things (IoT), it is continuously required to improve the efficiency of spectrum resources in a wireless network. Accordingly, various studies have been conducted to increase bandwidth, a data rate, etc. Among the studies, in-band FD communication systems have been spotlighted as next-generation technology for improving the efficiency of insufficient frequency resources.

In-band FD communication is wireless communication technology that simultaneously performs transmission and reception in the same frequency band. Theoretically, twofold network throughput can be acquired in the FD communication, compared to half-duplex (HD) communication using the same frequency band. However, transmission and reception of a signal are simultaneously performed in the same frequency band, and thus, a transmitted signal may cause interference in a desired signal to be received. In the disclosure, a desired signal means a signal that a communication device desires to receive. In the FD communication, transmission and reception are simultaneously performed, a signal transmitted by the communication device causes interference in the desired signal, and in this case, the interference signal may be defined as a self-interference (SI) signal. Theoretically, the SI signal corresponds to a signal transmitted by the communication device, and thus, the communication device can completely eliminate the SI signal generated due to a transmission signal by using information on a transmission or reception signal. However, in an actual management stage, there is a difficulty in perfectly eliminating the SI signal non-linearly distorted due to operational characteristics of communication devices. When only eliminating a linear component of the SI, it may be difficult to receive a desired signal due to the intensity of power of the remaining non-linear component. Accordingly, studies on a method for eliminating the non-linearly distorted SI have been actively conducted and various self-interference cancellation (SIC) techniques have been provided.

Hereinafter, a full-duplex self-interference cancellation (FD SIC) technique is described with reference to FIG. 1.

FIG. 1 illustrates a structure of an FD communication device according to an embodiment of the present disclosure.

An FD SIC technique is a technique of estimating and removing the SI based on information of a signal transmitted by an apparatus itself. Admittedly, SI has mostly linear components. However, FD performance can be further maximized by removing even the remaining non-linear components originating from the imperfections of transceiver elements. The FD SIC technique may be classified into SIC of a passive analog area 110, SIC of an active analog area 120, and SIC of a digital area 130 according to an area in which SIC is performed in a communication device 100. The SIC of the passive analog area 110 corresponds to a technique of removing SI without separate signal processing, and uses a method of deriving reception of the SI in a reception antenna 115 in an attenuated state. According to the SIC of the active analog area 120, SI 125 received in the analog area is estimated and removed according to an analog area signal of the communication device. According to the SIC of the digital area 130, the SIC is performed in the digital area and residual SI remaining after excluding from the analog area is removed according to a digital area signal 135 of the communication device. Finally, the SIC technique is applied to reduce the residual SI to the level of thermal noise.

The conventional digital area SIC technique 130 generally assumes management in a static channel environment and thus uses a method for removing SI by applying SI channel information estimated by receiving SI only in advance to FD communication. In the static channel environment, SI channel information which has been once estimated can be used for a long time, a channel estimation update period can be configured very long, and thus an SI channel can be re-estimated when there is no desired signal, whereby estimating an SI channel in advance and use the same for the SIC is possible.

In an actual mobile communication environment, a change in a channel due to movement of an article around a transmission or reception device is made, and thus time-variance of the SI channel is to be considered and SI channel estimation is to be performed during FD communication. In this case, when SI channel estimation is performed in an environment receiving a desired signal, the desired signal interrupts the SI channel estimation, and thus SIC performance deteriorates. In other words, SI channel estimation is performed in a process of performing actual FD communication, a desired signal acts as noise in the SI channel estimation, and thus SIC performance may be restricted.

Accordingly, for accurate SI channel estimation, an invertal operating as HD (or quasi-HD) between entities performing FD communication for enhancing SI channel estimation performance of each entity may be configured to improve SI channel estimation performance. The communication device of FIG. 1 may correspond to a communication entity performing FD communication and may mean a base station or a terminal in the disclosure. In the disclosure, a communication entity represented as a terminal (or node) means an FD communication device and may be understood as a device which includes the terminal and the base station and performs FD communication, and a base station (or central node) may be understood as a special communication device performing scheduling or high-power transmission.

FIG. 2 illustrates an FD P2P communication environment and an FD base station communication environment.

In part (a) of FIG. 2, in a case of an FD P2P communication environment corresponding to bidirectional FD communication, a desired signal 211 or 221 of a terminal 210 or 220 corresponds to SI 222 or 212 of another terminal 220 or 210. In this case, power of a signal transmitted by each terminal may be different.

In part (b) of FIG. 2, in an FD base station environment, a base station 260 performs unidirectional FD communication and two UL and DL terminals 250 and 270 communicating with the base station performs HD communication. In this case, a UL signal 261 corresponds to a desired signal of the base station, and a DL signal 271 corresponds to SI 262 of the base station.

Scheduling of FD communication according to an embodiment of the disclosure restricts a predetermine interval, in which a desired signal of an FD communication device is transmitted, at low power, so as to prevent SI channel estimation of the FD communication device from being interrupted.

For example, referring to FIG. 2, in a case of FD P2P communication (part (a) of FIG. 2), two FD terminals 210 and 220 transmit 221 and 211 a signal to each other, and thus a desired signal of each of the terminals corresponds to a counterpart's SI. Accordingly, power in a predetermined interval in a transmission frame of each terminal is restricted at low power, so that SI channel estimation performance can be enhanced. In this case, an optimal value of the length of a yield interval (or lower-power transmission interval) assigned to each terminal may be different according to a communication environment. In the present disclosure, the yield interval may mean an interval in which a signal is transmitted at low power, and in this case, the low power may mean power having a value smaller than a specific reference value (threshold value) without interference in another signal, wherein the threshold value may be differently configured according to a communication environment. Each terminal is to perform SI channel estimation in an interval in which a counterpart has transmitted a signal at low power, and thus yield intervals to two terminals may be configured so as not to overlap with each other.

Likewise, in a case of FD base station communication (part (b) of FIG. 2), a terminal 250 transmits 261 a signal to a base station 260 via a UL, and the base station 260 transmits 271 a signal to a terminal 270 via a DL. In the FD base station environment (part (b) of FIG. 2), only the base station 260 performs FD communication, and accordingly, a low-power transmission interval may be configured in a transmission frame of a UL terminal 250 corresponding to a terminal transmitting a desired signal 261 of the base station. The base station 260 may estimate an SI channel in an interval in which a UL terminal has performed low-power transmission.

Figure 3:
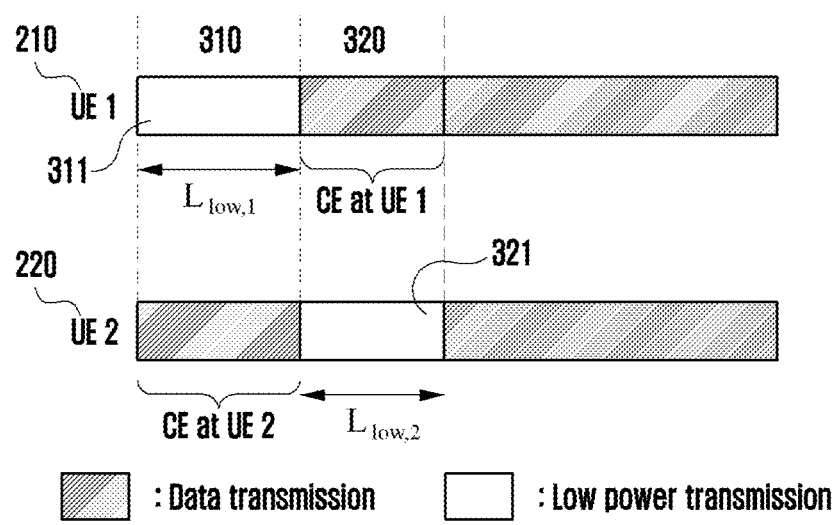
FIG. 3 illustrates a transmission frame scheduled in an FD P2P environment according to an embodiment of the present disclosure.

FIG. 3 illustrates a transmission frame scheduled in an FD P2P environment according to an embodiment of the present disclosure.

Referring to FIG. 3, a yield interval 311 may be configured for terminal 1 210 in the first interval 310, wherein low-power transmission to prevent restriction of SI channel estimation of terminal 2 220 is performed in the yield interval 311. In addition, a yield interval 321 may be configured for terminal 2 220 in the second interval 320, wherein low-power transmission to prevent restriction of SI channel estimation of terminal 1 210 is performed in the yield interval 321. The yield intervals may be configured according to signaling transmitted to a terminal by a base station, and the terminal may configure the same by itself according to information and a parameter received from the base station in advance.

Figure 4:
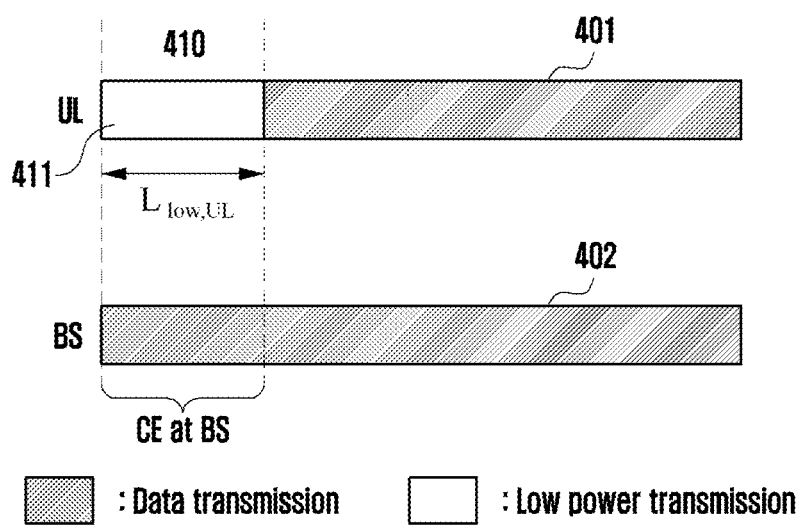
FIG. 4 illustrates a transmission frame scheduled in an FD base station environment according to an embodiment of the present disclosure.

FIG. 4 illustrates a transmission frame scheduled in an FD base station environment according to an embodiment of the present disclosure.

Referring to FIGS. 2 and 4, a yield interval 411 may be configured for a transmission terminal 250 in the first interval 410 of a UL transmission frame 401, wherein a low-power transmission to prevent restriction of SI channel estimation of a base station 260 is performed in the yield interval 411. However, the transmission terminal 250 performs HD communication, and thus, there is no need to consider an interference phenomenon occurring in the FD communication, whereby no separate low-power transmission interval for the transmission terminal 250 is to be configured for the base station. In addition, a reception terminal 270 also performs HD communication for reception only, and thus no separate low-power transmission interval is configured for the base station within a transmission frame 402 of the base station.

When the above-described FD scheduling is performed, the length of a yield interval of each terminal needs to be properly determined. When the length of the yield interval is short, SI channel estimation performance deteriorates, and thus the SINR of a desired signal is reduced. When the length of the yield interval is long, a signal transmission ratio within an FD frame is reduced. Accordingly, in order to maximize frequency efficiency, optimization of the length of the yield interval is required.

The optimization of the yield interval length of each terminal participating in the FD communication according to an embodiment of the disclosure may be performed so that a sum of network frequency efficiency values can maximized. An influential factor in the frequency efficiency may include a yield interval ratio within a frame and an SINR after SIC of a desired signal. The optimization of the yield interval length of each terminal participating in the FD communication may be represented as Equation 1 below:

[Equation 1]

$$\beta_{opt} = \underset{\beta}{\operatorname{argmax}} \sum_{i=1}^{2} \frac{L_F - \beta_i}{L_F} \log_2(1 - \gamma_i) \quad (1)$$

$$\beta = \{\beta_1, \beta_2\} \quad (2)$$
$$\gamma_i$$
$$\beta_i$$

The present disclosure provides a technology for elaborately performing SIC even in multi-user FD communication according to general scheduling of FD communication. A scheduling method according to an embodiment of the disclosure may be applied to design and management of a wireless network to which FD communication is applied.

According to an embodiment of the disclosure, in order to generalize an FD scheduling technique, a scheduling interval pattern determining method which can be applied to various communication scenarios is provided in consideration of an environment in which multiple terminals exist in one FD topology. To this end, the disclosure provides classification of FD communication topologies which may exist in a mesh network and a cellular network, and an algorithm for determining a scheduling interval pattern for each FD topology classification. In addition, a communication method for managing FD scheduling is disclosed.

In addition, according to the disclosure, a scheduling method for each topology may be differently determined according to whether there is a base station in an FD topology. That is, a scheduling method of the disclosure is divided into a scheduling method in a mesh network and a scheduling method in a cellular network, and the scheduling method for each network may be applied. In the disclosure, communication scenarios for FD communication are divided into a scenario in a mesh network and a scenario in a cellular network, and a scheduling algorithm for each of the scenarios is disclosed.

In addition, an embodiment of the disclosure may be applied to a transmission frame scheduling method which can reduce not only SI in a desired signal but also interference between terminals by properly arranging yield intervals (low-power transmission intervals).

Hereinafter, according to the disclosure, a method for classifying an FD communication topology is described.

In general, FD communication is classified into FD P2P communication and FD non-P2P communication. The FD P2P communication corresponds to a communication topology in a case in which a signal transmission object and a signal reception object of a terminal performing FD communication are identical. The FD non-P2P communication corresponds to a communication topology in a case in which a signal transmission object and a signal reception object of a terminal performing FD communication are different.

In FIG. 2, FD P2P communication (part (a) of FIG. 2) and FD base station communication (part (b) of FIG. 2) corresponding to an example of the FD non-P2P communication are illustrated.

The FD P2P topology and the FD non-P2P topology may be extended to an FD mesh network and an FD cellular network, respectively. In this case, a communication topology means an object including devices for performing FD communication, the devices being connected to each other in a single hop or multiple hops. Various FD communication topologies may exist in each network.

Figure 5:
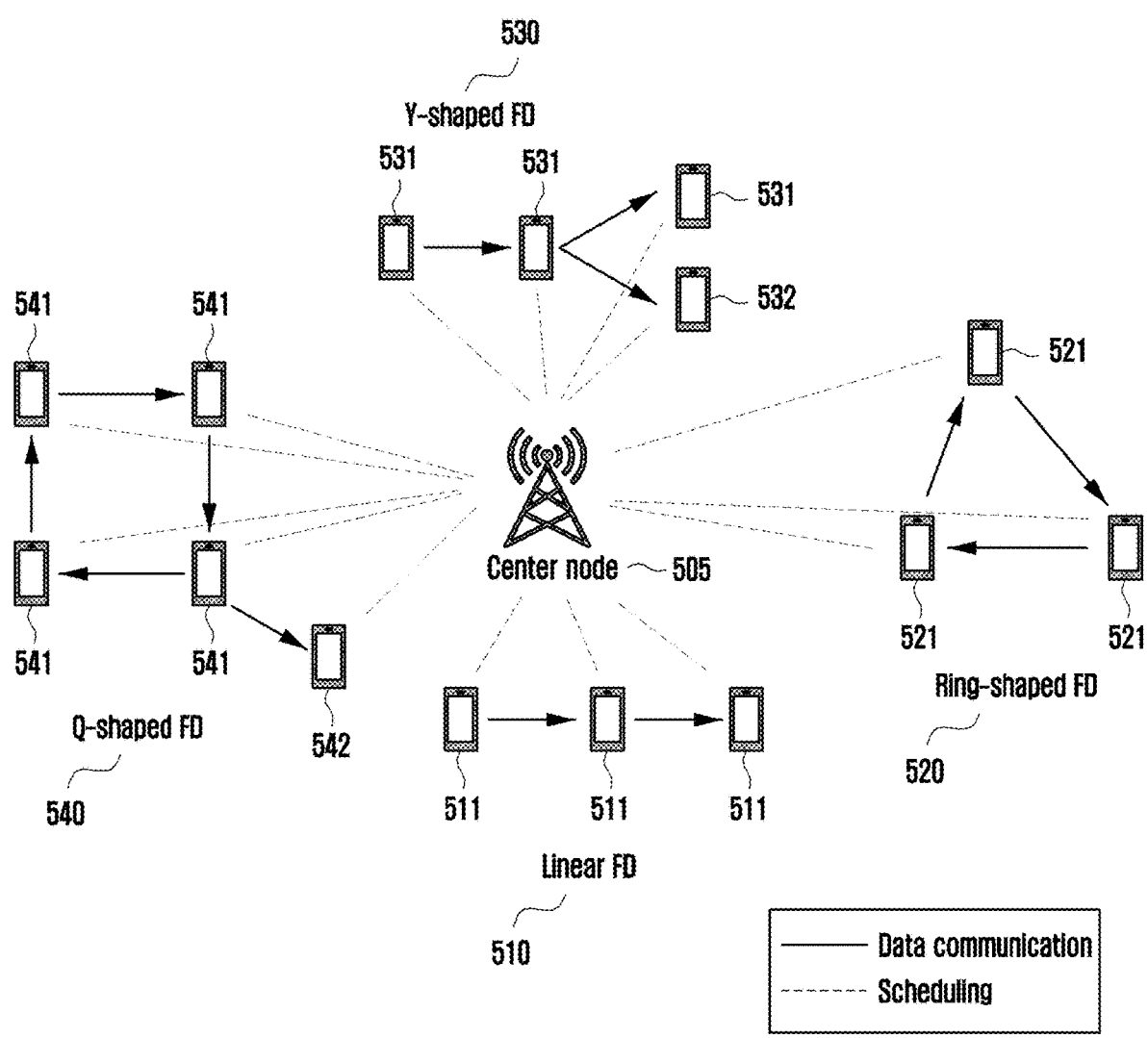
FIG. 5 illustrates a system model of an FD mesh network.

FIG. 5 illustrates a system model of an FD mesh network.

An FD wireless mesh network assumed in the disclosure may mean an environment in which elements of a network may have an FD link or may configure an ad-hoc link. An ad-hoc network corresponds to a network including terminals only, and direct communication between terminals is performed therein. In the communication between terminals in the ad-hoc network, a central system such as a wired network or a base station is not used, and when two terminals which are positioned far away from each other perform communication, other terminals in the network may function as a relay node. In this case, a terminal to be used as a relay node may determine the mobility of each terminal according to a routing algorithm. In the system model used in the disclosure, communication between terminals is considered, but terminals between two terminals which are positioned far away from each other do not necessarily operate as relay nodes. In some cases, the terminals may operate as relays, or a central control node may restrict communication of other terminals for direct connection between two terminals. In addition, in the system model of the disclosure, FD communication of a terminal is considered, and thus, there may be more interference in a network. In a wireless ad-hoc network, FD links may configure a network topology according to communication requirements of communication elements and a physical channel environment and restriction. There is no restriction on topology configuration in the convention mesh network, but because of the characteristic of an FD link, there is a specific topology mainly configured, and thus a scheduling method under the main topology is provided.

In a case of an FD mesh network, FD communication between terminals 511, 521, 531, and 541 is assumed, and it is assumed that a base station 505 performs scheduling only and does not participate in the FD communication. In this case, a topology connection may be determined by a base station or a central node according to an activated FD link, and a terminal index may be determined according to a transmission or reception sequence of each terminal.

Referring to FIG. 5, a model for unicast may be classified into a linear FD topology 510 and a ring-shaped FD topology 520, and a model for multicast may be classified into a Y-shaped FD topology 530 and a Q-shaped FD topology 540.

In the linear FD topology 510, terminals are consecutively connected. Terminals to which the first index and the last index of the topology are assigned perform HD communication, and the other terminal performs unidirectional FD communication.

The ring-shaped FD topology 520 has a structure in which two terminals performing HD communication in the linear FD topology are connected and forms a ring, wherein all terminals in the topology perform unidirectional FD communication.

The Y-shaped FD topology 530 has a structure in which a terminal 532 performing multicast exists in the linear FD topology 510 of the unicast, and the Q-shaped FD topology 540 is considered as a structure in which a terminal 542 performing multicast exists in the ring-shaped FD topology 520 of the unicast. That is, the Y-shaped FD topology 530 is a structure obtained by adding a multicast chain to the linear FD topology 510, and the Q-shaped FD topology 540 is a structure obtained by adding a multicast chain to the ring-shaped FD topology 520.

Figure 6:
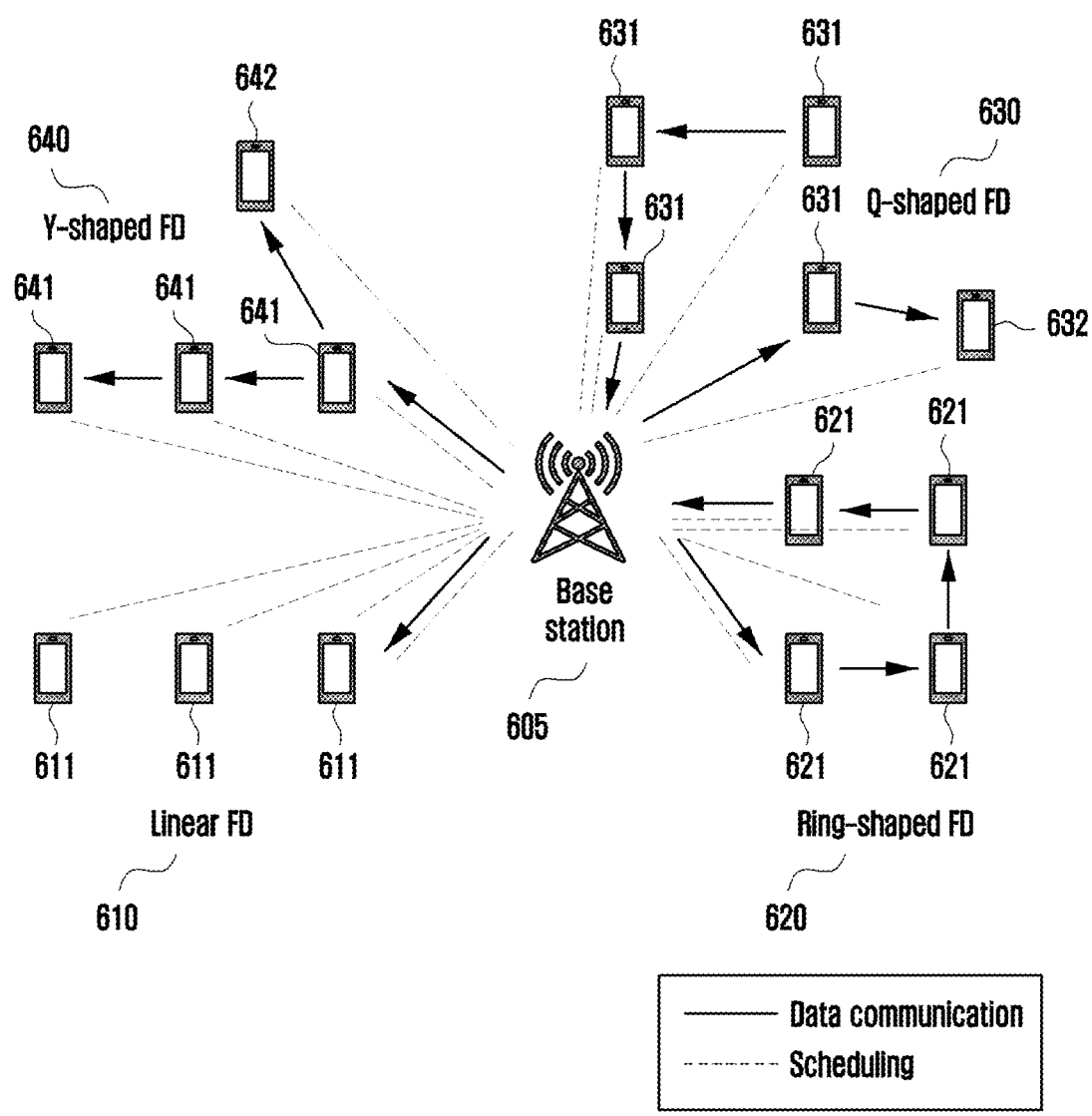
FIG. 6 illustrates a system model of an FD cellular network.

FIG. 6 illustrates a system model of an FD cellular network.

In a case of a cellular network, it is assumed that a base station 605 performs scheduling and participates in FD communication. Referring to FIG. 6, an FD communication topology for unicast is classified into a linear FD topology 610 and a ring-shaped FD topology 620 like the mesh network. In this case, structures of the linear FD topology 610 and the ring-shaped FD topology 620 in the cellular network are identical to the structures of the linear FD topology 610 and the ring-shaped FD topology 620 in the mesh network, but the base station 605 other than a terminal may be included in the FD communication topology in the cellular network to perform FD communication. The FD communication topology for multicast is classified into a Y-shaped FD topology 640 and a Q-shaped FD topology 630. The Y-shaped FD topology 640 is a structure obtained by adding a multicast chain 642 to the linear FD topology 610, and the Q-shaped FD topology 630 is a structure obtained by adding a multicast chain 632 to the ring-shaped FD topology 620.

The present disclosure provides a method for determining a scheduling pattern of a transmission frame in a time area for SI channel estimation (CE) for multiple FD terminals in FD mesh network and FD cellular network environments. More specifically, the disclosure provides a communication protocol for FD scheduling and a method for determining a yield interval pattern corresponding an FD transmission frame scheduling pattern to avoid a desired signal in FD communication.

Through an embodiment and modification of the disclosure, for the above-described various FD communication scenarios, a proper FD scheduling pattern may be determined. The FD scheduling pattern determination method may determine a generalized yield interval pattern according to yield interval lengths assigned to devices for performing FD communication. In this case, the yield interval length assigned to each of the devices may be a predetermined value determined before communication, or a value obtained through optimization in the perspective of a network sum rate, etc.

1. Scheduling Method in an FD Mesh Network

First, a scheduling method for an FD mesh network is described according to an embodiment of the disclosure.

In an embodiment of the disclosure as described above, in a mesh network, it is assumed that direct communication between terminals is considered, and a base station performs scheduling only for each terminal and does not participate in FD communication. Accordingly, in the embodiment, there is no exception to a rule of determining a scheduling pattern so that a base station transmits a signal at high power.

1.1. A Procedure of Determining a Communication Topology Structure (Commonly Applied to Both Mesh Network and Cellular Network)

A change in a scheduling interval pattern and a yield interval length of each terminal due to a FD communication environment change may be newly applied to a network through a procedure of determining a communication topology structure, and new scheduling may be applied when a terminal is added or removed from an FD communication topology. In addition, through identification of the size of interference between nodes, whether to maintain FD communication of the corresponding topology may be determined. To this end, the procedure of determining a topology structure may be periodically used in a communication protocol.

A procedure of identifying a communication topology structure may be as follows:

(1) Terminals participating in FD communication transmit source-destination information to a base station;
(2) Routing between terminals is performed and a unique number is assigned to each terminal according to information received from a terminal by a base station;
(3) Each terminal transmits a pilot signal and measures information required for scheduling according to a number assigned to a base station;
(4) A terminal transfers information required for scheduling to a base station;
(5) A base station determines whether to perform FD communication and perform transmission frame scheduling of each terminal according to communication environment information received from a terminal; and/or
(6) A base station transfers scheduling information to each terminal.

This procedure may be executed when a communication environment, such as a situation in which a communication channel changes or a terminal of a topology is added or removed, changes. A communication topology is identified through the procedure, the base station may apply a scheduling pattern determining method corresponding to the identified communication topology.

Hereinafter, a method for determining a scheduling pattern according to each communication topology is described.

1.2. A Method for Determining a Scheduling Pattern in a Case of a Linear FD Topology In a case of a linear FD topology as shown in 510 on FIG. 5, a yield interval may be configured for each terminal with avoidance of an interval (i.e., a yield interval of a terminal for transmitting a desired signal) in which a desired signal that each terminal is to receive is transmitted at low power. As described above, a yield interval of a specific terminal may be allocated only when a terminal receiving a signal transmitted by a specific terminal performs FD communication. Hereinafter, in the disclosure, for convenience of description, it is assumed that there is an index value in the terminal. For example, when a terminal having a terminal index "i" corresponds to a terminal performing FD communication, the terminal may receive a signal from a terminal having a terminal index "i−1," and simultaneously, may transmit a signal to a terminal having a terminal index "i+1." In addition, terminals having different terminal indices may have different topologies or may be terminals in different chains when a topology has a multicast structure. For convenience of description, when a terminal has a terminal index "i," the terminal may be called an "i-th terminal" or "terminal i," and in the disclosure, the "i-th terminal" or the "terminal i" means a terminal having a terminal index "i."

An algorithm of determining a scheduling pattern for the linear FD topology according to an embodiment of the disclosure may be as shown in Table 1 below.

TABLE 1

Parameters: number of topologies existing in topology object (N)
Output: scheduled transmission frame
begin:
  i ← 1
  while scheduling do TABLE 1-continued

```
    if i = 1
        allocate yield interval at foremost position in transmission frame
for terminal i
    else if i = N − 1
        allocate no yield interval to terminal i
    else if i = N
        allocate no yield interval to terminal i
    else
        allocate yield interval to terminal i, not overlapping yield interval
of terminal i − 1
        i ← i + 1
    end
end
```

In other words, in allocating a yield interval for each of terminals according to an embodiment of the disclosure, when there are N terminals in a topology, a base station may allocate a yield interval at the foremost position of a transmission frame of terminal 1, may not allocate a yield interval to a terminal having a terminal index N−1 or N, and may allocate yield intervals so that the yield intervals of terminals having neighboring indices do not overlap with each other. An algorithm for Table 1 above may also be implemented as shown in Table 2 below:

TABLE 2

| Parameters: | frame symbol index set: [1,M] |
| | number of terminals existing in topology object: N |
| | $\beta_i$: length of yield interval of i-th terminal |
| | $D_i$: frame symbol index set of yield interval of i-th terminal |
| Output: | position of yield interval of each terminal in transmission frame |

```
begin:
    D_i = ∅ ∀i
    i ← 1
    while i ≤ N
        if i = 1
            determine D_i such that D_i ⊂ [1, M] & |D_i| = β_i
        elseif i ≤ N − 2
            determine D_i such that D_i ⊂ [1, M] & D_{i−1} ∩ D_i = ∅ & |D_i| = β_i
        i ← i + 1
    end
end
```

| ∅ | | |
|---|---|---|
| | $D_i$ | 1 | $D_i$ |

Figure 7:
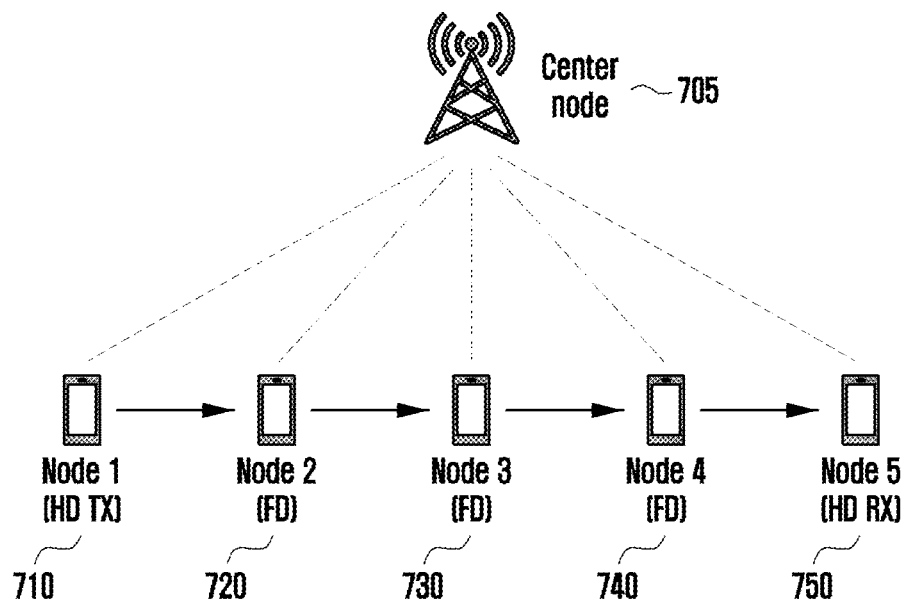
FIG. 7 illustrates a scenario of a linear FD topology in an FD mesh network according to an embodiment of the present disclosure.

FIG. 7 illustrates a scenario of a linear FD topology in an FD mesh network according to an embodiment of the present disclosure.

In the scenario of FIG. 7, the number of terminals in a topology object is five, and a terminal 750 having a terminal index "5" performs HD reception communication only, and thus, there is no need to configure a yield interval for terminal 4 740, and terminal 5 750 performs reception only and no transmission resource is allocated thereto. Scheduling according to an embodiment of the disclosure for this scenario may be determined as shown in FIGS. 8 and 9.

Figure 8:
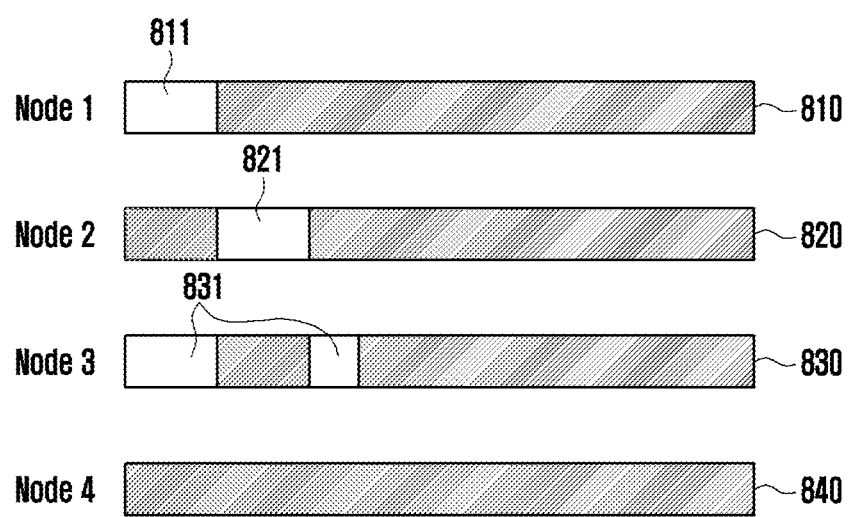
FIG. 8 illustrates a transmission frame scheduled for a scenario of a linear FD topology in an FD mesh network according to an embodiment of the present disclosure.
Figure 9:
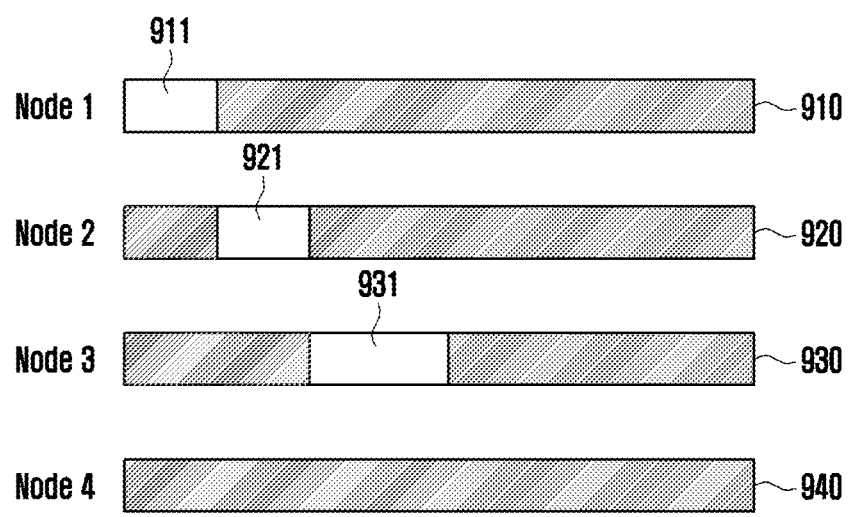
FIG. 9 illustrates a transmission frame scheduled for a scenario of a linear FD topology in an FD mesh network according to an embodiment of the present disclosure.

FIG. 8 illustrates a transmission frame scheduled according to an embodiment of the disclosure in a scenario of a linear FD topology in an FD mesh network, and FIG. 9 illustrates a transmission frame scheduled according to an embodiment of the disclosure in a scenario of a linear FD topology in an FD mesh network.

In another example, when the minimum index condition and $U_{j=1}^{i-1}(D_j \cap D_i) = \phi$ are added to a $D_i$ determination condition, yield intervals of respective terminals may be scheduled to be allocated at the foremost position in the transmission frame while not overlapping with each other as shown in an example in FIG. 9. Through this scheduling pattern determination method, one scheduling interval pattern as shown in FIG. 9 may be acquired even though the number of terminals in the topology and the length of the yield interval of each terminal have any value.

Figure 10:
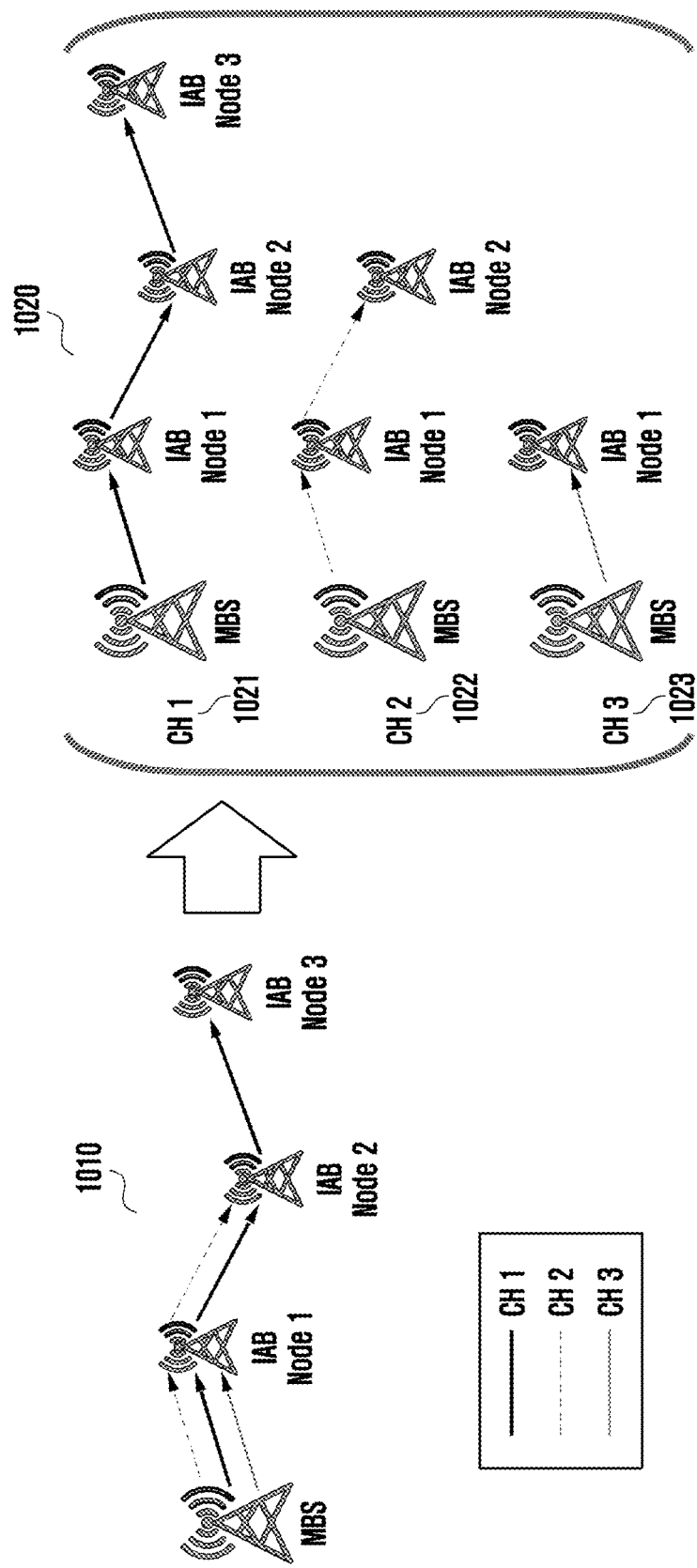
FIG. 10 illustrates FD communication for a backhaul network in an integrated access and backhaul (IAB) network.

FIG. 10 illustrates FD communication for a backhaul network in an integrated access and backhaul (IAB) network. The IAB network corresponds to a network which is appropriate for the FD communication described in the disclosure to be applied, and thus the scheduling method for FD communication in the specification may be applied to a scheduling method in communication between IAB nodes in the IAB network.

Referring to FIG. 10, there may be FD communication for wireless backhaul in the IAB network, and linear FD topology scheduling according to an embodiment of the disclosure may be applied when scheduling is allocated to the FD communication for wireless backhaul. FD communication in the IAB network may be normally performed in the form of FD backhaul relaying 1010. In a case of a backhaul link in the IAB network, more channels (frequency resources) are allocated 1020 to a link closer to a macro base station (MBS), and in this case, FD relaying is independently performed for each channel 1021, 1022, or 1023. In other words, an example of an FD IAB network of 1010 may be divided into three linear FD communication topology objects 1021, 1022, and 1023 which perform FD communication through respective channels as shown in 1020. In this case, respective channels do not interfere with each other, and thus a scheduling technique in linear FD communication may be independently applied to perform scheduling for the FD backhaul link in the IAB network. In other words, in 1021, 1022, and 1023, a scheduling pattern may be determined by applying an algorithm according to an embodiment of the disclosure, considering that 1021 corresponds to a linear FD topology in which N=4, 1022 corresponds to a linear FD topology in which N=3, and 1023 corresponds to a linear FD topology in which N=2.

1.3. A Method for Determining a Scheduling Pattern in a Case of a Ring-Shaped FD Topology In a ring-shaped structure scheduling pattern determination method as shown in 520 on FIG. 5, for each terminal, a base station may determine a yield interval for each terminal with avoidance of a yield interval of the previous terminal. In addition, in the ring-shaped structure scheduling pattern determination method, not only the position of a yield interval of the previous terminal but also the position of a yield interval of the next terminal may be considered. That is, when a terminal having the largest terminal index transmits a signal to terminal 1, a yield interval of the last terminal may not overlap a yield interval of terminal 1 to perform SI channel estimation of terminal 1.

An algorithm of determining a scheduling pattern for the ring-shaped FD topology according to an embodiment of the disclosure may be as shown in Table 3 below.

TABLE 3

Parameters: number of topologies existing in topology object (N)
Output: scheduled transmission frame
```
begin:
    i ← 1
    while scheduling do
        if i = 1
            allocate yield interval at foremost position in transmission frame
for terminal i
        else if i = N
```

TABLE 3-continued

```
   allocate yield interval to terminal i such that yield interval of
terminal i − 1 and yield interval of terminal 1 do not overlap with each
other
      else
         allocate yield interval to terminal i, not overlapping yield
interval of terminal i − 1
         i ← i + 1
      end
end
```

In other words, in allocating a yield interval for each of terminals according to an embodiment of the disclosure, when there are N terminals in a topology, a base station may allocate a yield interval at the foremost position of a transmission frame of terminal 1, may allocate a yield interval to the N-th terminal so that the yield interval of the N-th terminal does not overlap with the yield intervals of the (N−1)-th terminal and terminal 1, and may allocate yield intervals to the remaining terminals so that the yield intervals of the remaining terminals having neighboring indices do not overlap with each other. An algorithm for Table 3 above may be implemented as shown in Table 4 below:

TABLE 4

```
Parameters:   frame symbol index set: [1,M]
              number of terminals existing in topology object: N
              β_i: length of yield interval of i-th terminal
              D_i: frame symbol index set of yield interval of i-th
terminal
Output:       position of yield interval of each terminal in
transmission frame
begin:
   D_i = Ø ∀i
   i ← 1
   while i ≤ N
      if i = 1
         determine D_i such that D_i ⊂ [1,M] & |D_i| = β_i
      elseif i ≤ N − 1
         determine D_i such that D_i ⊂ [1,M] & D_{i−1} ∩ D_i = Ø & |D_i| =
         β_i
      elseif i = N
         determine D_i such that D_i ⊂ [1,M] & D_{i−1} ∩ D_i = Ø & D_i ∩
         D_1 = Ø & |D_i| = β_i
      i ← i + 1
   end
end
```

In Table 4, $\phi$ indicates a null set. As an example of a scheduling pattern, a minimum index condition may be added in an operation of determining yield intervals $D_i$ of terminal 1. In this case, a yield interval is positioned at the foremost position of a transmission frame, and thus SI channel estimation can be performed at the earliest time, whereby a transmission rate within a transmission interval can be increased.

Figure 11:
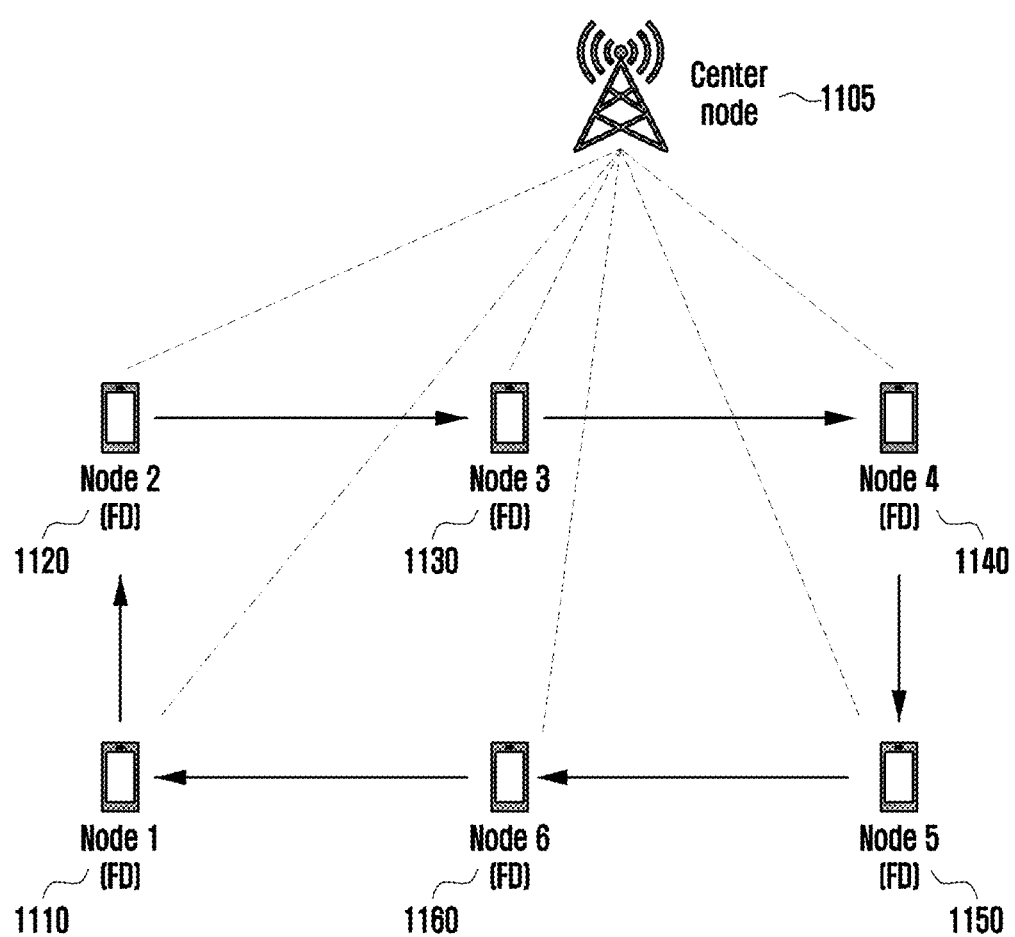
FIG. 11 illustrates a scenario of a ring-shaped FD topology in an FD mesh network according to an embodiment of the present disclosure.

FIG. 11 illustrates a scenario of a ring-shaped FD topology in an FD mesh network according to an embodiment of the present disclosure.

Figure 12:
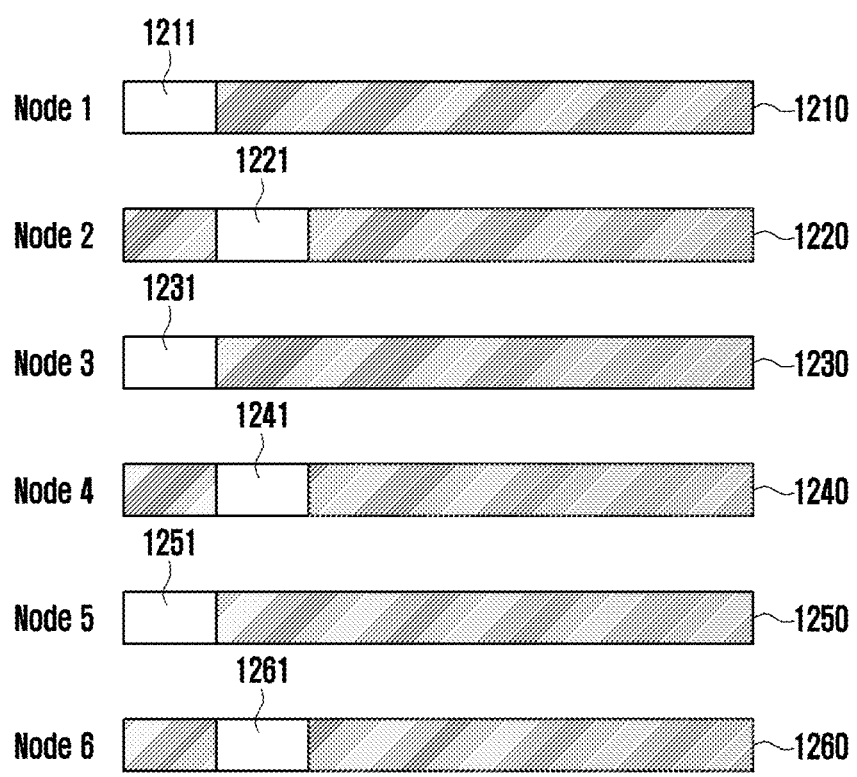
FIG. 12 illustrates a transmission frame scheduled for a scenario of a ring-shaped FD topology in an FD mesh network according to an embodiment of the disclosure.
Figure 13:
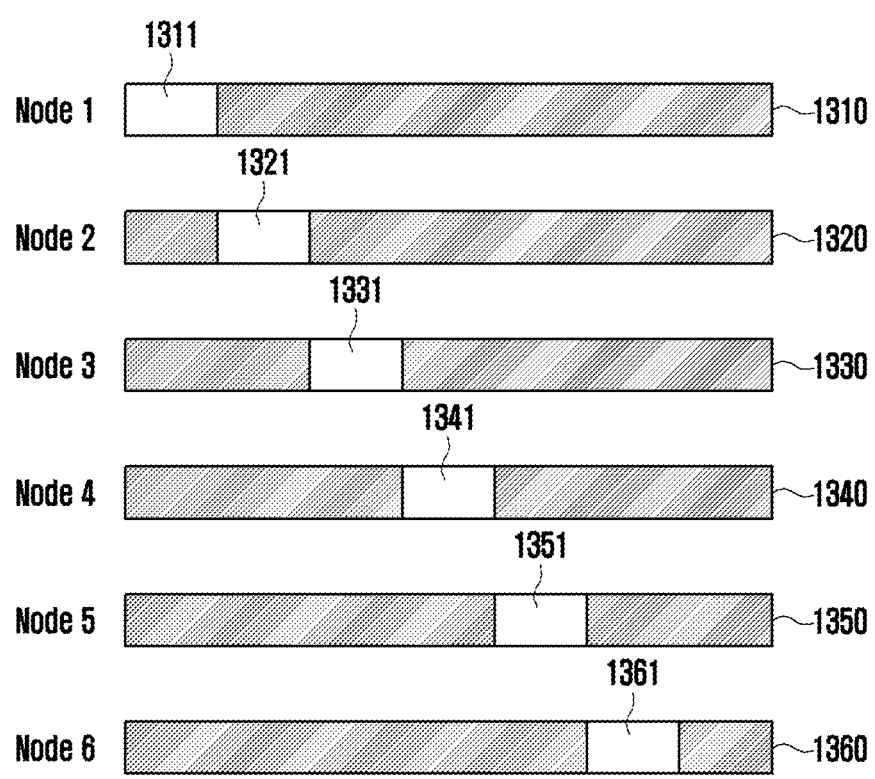
FIG. 13 illustrates a transmission frame scheduled for a scenario of a ring-shaped FD topology in an FD mesh network according to an embodiment of the present disclosure.

In the scenario of FIG. 11, the number of terminals in a topology object is six, and all of FIG. 12 illustrates a transmission frame scheduled for a scenario of a ring-shaped FD topology in an FD mesh network according to an embodiment of the present disclosure, and FIG. 13 illustrates a transmission frame scheduled for a scenario of a ring-shaped FD topology in an FD mesh network according to an embodiment of the present disclosure.

In a case of FIG. 12, a yield interval 1211, 1221, 1231, 1241, 1251, or 1261 of each terminal in a transmission frame is scheduled to be allocated in the front position of the transmission frame. When the minimum index condition is added to an algorithm in Table 3 and Table 4, scheduling may be determined as shown in FIG. 12.

In another example, when the minimum index condition and $U_{j=1}^{i-1}(D_j \cap D_i)=\phi$ are added to a $D_i$ determination condition, all yield intervals of respective terminals may be scheduled to be allocated at the foremost position in the transmission frame while not overlapping with each other as shown in an example in FIG. 13. Through this scheduling pattern determination method, one scheduling interval pattern as shown in FIG. 13 may be acquired even though the number of terminals in the topology and the length of the yield interval of each terminal have any value.

1.4. Scheduling in Consideration of Multicast in a Communication Topology (for Q-Shaped and Y-Shaped Topologies)

Multicast in FD communication defined in the disclosure means simultaneously performing signal transmission and reception in the same frequency band by a communication device which transmits a signal to multiple terminals. In this case, the interference between terminals in a topology may be very low in order to perform FD communication. As described above, in comparison with the linear FD topology and the ring-shaped FD topology, which are unicast topologies, a Y-shaped FD topology and a Q-shaped FD topology, which are multicast topologies, have structures obtained by adding linear FD topologies to the linear FD topology and the ring-shaped FD topology. Accordingly, the multicast may be considered as a structure obtained by adding a multicast chain (additional reception terminal) to a unicast chain (linear or ring-shaped FD topology).

In the multicast FD topology scheduling method according to an embodiment of the disclosure, a base station may schedule a unicast chain first, and then schedule a multicast chain. In this case, a scheduling pattern of terminals corresponding to the unicast chain may be identical to a scheduling pattern in a case of considering unicast only. In a case of the multicast chain, the first terminal in the multicast chain is included in the unicast chain and the position of a yield interval is already determined, and thus the remaining terminals in the multicast chain may use a method for receiving allocation of a yield interval with avoidance of a yield interval of a desired signal in the same manner as the algorithm used in the unicast.

Figure 14:
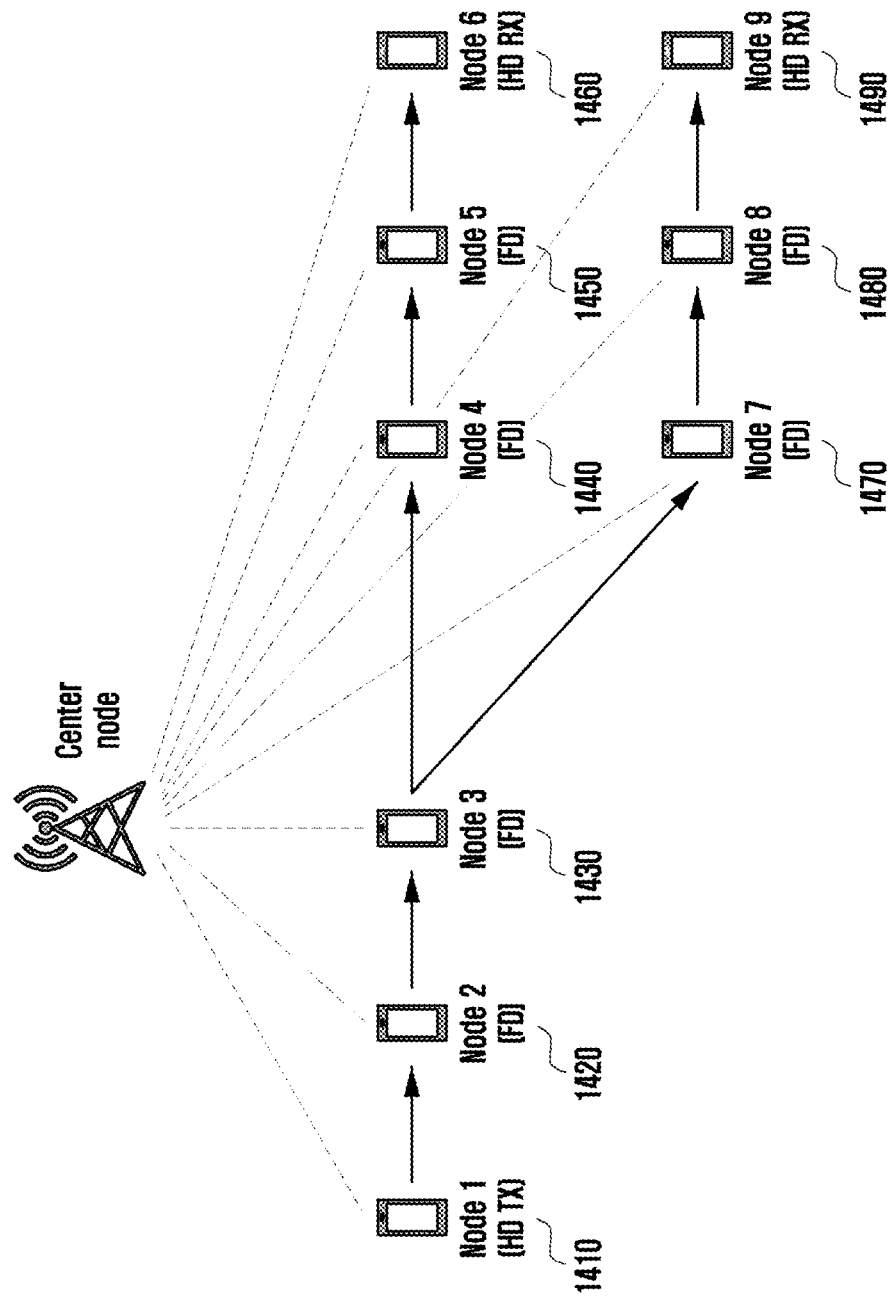
FIG. 14 illustrates a scenario of a multicast topology (Y-shaped FD topology) in an FD mesh network according to an embodiment of the present disclosure.

FIG. 14 illustrates a scenario of a multicast topology (Y-shaped FD topology) in an FD mesh network according to an embodiment of the present disclosure.

Referring to FIG. 14, it may be understood that each of terminals 1 to 6 1410, 1420, 1430, 1440, 1450, and 1460 corresponds to a unicast chain, and each of terminals 7 to 9 1470, 1480, and 1490 corresponds to a multicast chain added to the unicast chain. Scheduling for this scenario according to an embodiment of the disclosure may be determined as shown in FIG. 15.

Figure 15:
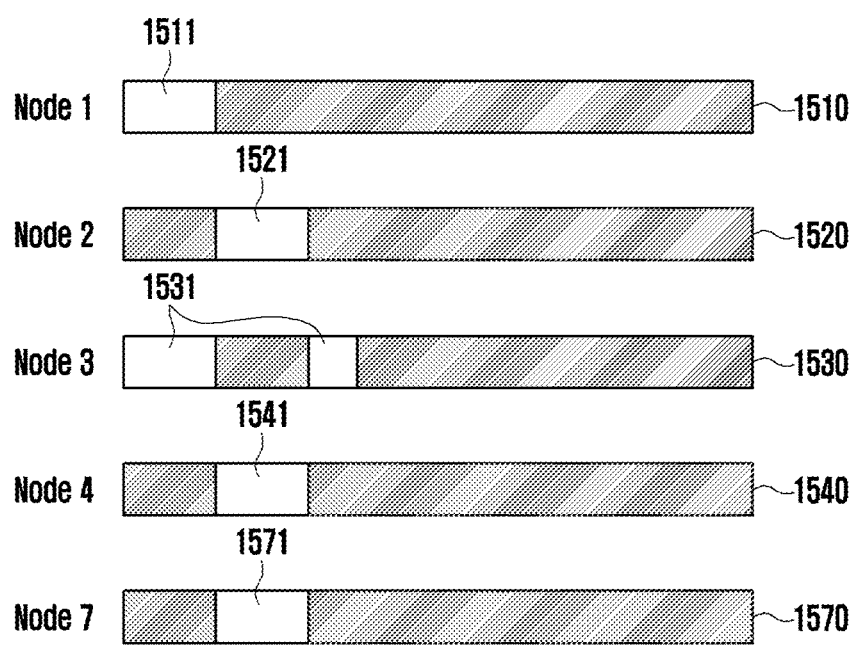
FIG. 15 illustrates a transmission frame scheduled for a scenario of a multicast topology in an FD mesh network according to an embodiment of the present disclosure.

FIG. 15 illustrates a transmission frame scheduled for a scenario of a multicast topology in an FD mesh network according to an embodiment of the present disclosure.

Referring to FIG. 15, terminals 1 to 4 1410, 1420, 1430, and 1440 correspond to transmission frames 1510, 1520, 1530, and 1540 in a case of N=6 according to an algorithm in Table 1 or Table 2, and yield intervals 1511, 1521, 1531, and 1541 are configured while not overlapping with each other in the corresponding front positions. Terminal 6 1460 performs HD reception communication, and thus, there is no need to configure a yield interval for terminal 5 1450, and no transmission resource is configured for terminal 6 1460. Likewise, for the multicast chain, an algorithm in a case of N=4 in Table 1 or Table 2 is applied, wherein a yield interval 1531 is already configured for terminal 3 1430 corresponding to the first index terminal, and thus, a yield interval may be configured for the remaining terminals (i.e., i=2 in an algorithm may be applied). In other words, in the transmission frame 1570 of terminal 7 1460, a yield interval 1571 may be configured for terminal 3 while not overlapping the already configured yield interval 1531, and terminal 9 1490 performs HD reception communication, and thus, there is no need to configure a yield interval for terminal 8 1480, and no transmission resource may be configured for terminal 9 1490.

1.5. A Scheduling Method for a Multi-FD Topology

An embodiment according to the disclosure may be extended to a multi-FD topology environment. The multi-FD topology environment corresponds to a communication environment in which two or more FD communication topology objects exist in the same network.

When multiple FD topology objects exist in a mesh network environment, the objects interfere with each other. In this case, the interference gets greater and there is a limit to a desired signal SINR after removal of SI, and thus, the level of required SI channel estimation performance decreases. Accordingly, even in an environment in which additional interference occurs, each topology object may be scheduled in the same manner as in a single FD topology environment, and each topology barely influences a scheduling result of other topologies.

Figure 16:
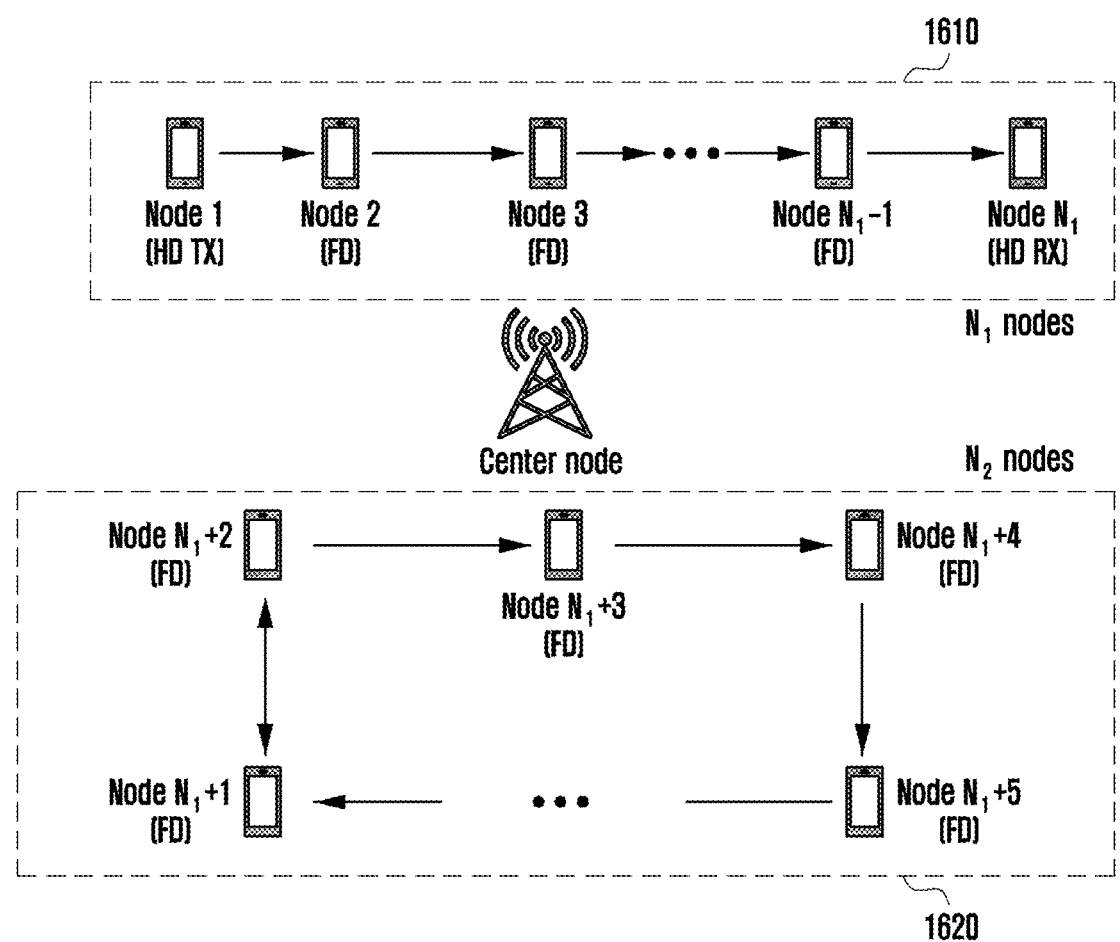
FIG. 16 illustrates an example of a multi-FD topology in which a linear FD topology and a ring-shaped FD topology are simultaneously exist according to an embodiment of the present disclosure.

FIG. 16 illustrates an example of a multi-FD topology in which a linear FD topology 1610 and a ring-shaped FD topology 1620 are simultaneously exist and to which an embodiment of the disclosure is applied. Scheduling according to an embodiment of the disclosure for the example in FIG. 16 may be determined as shown in FIG. 17.

Figure 17:
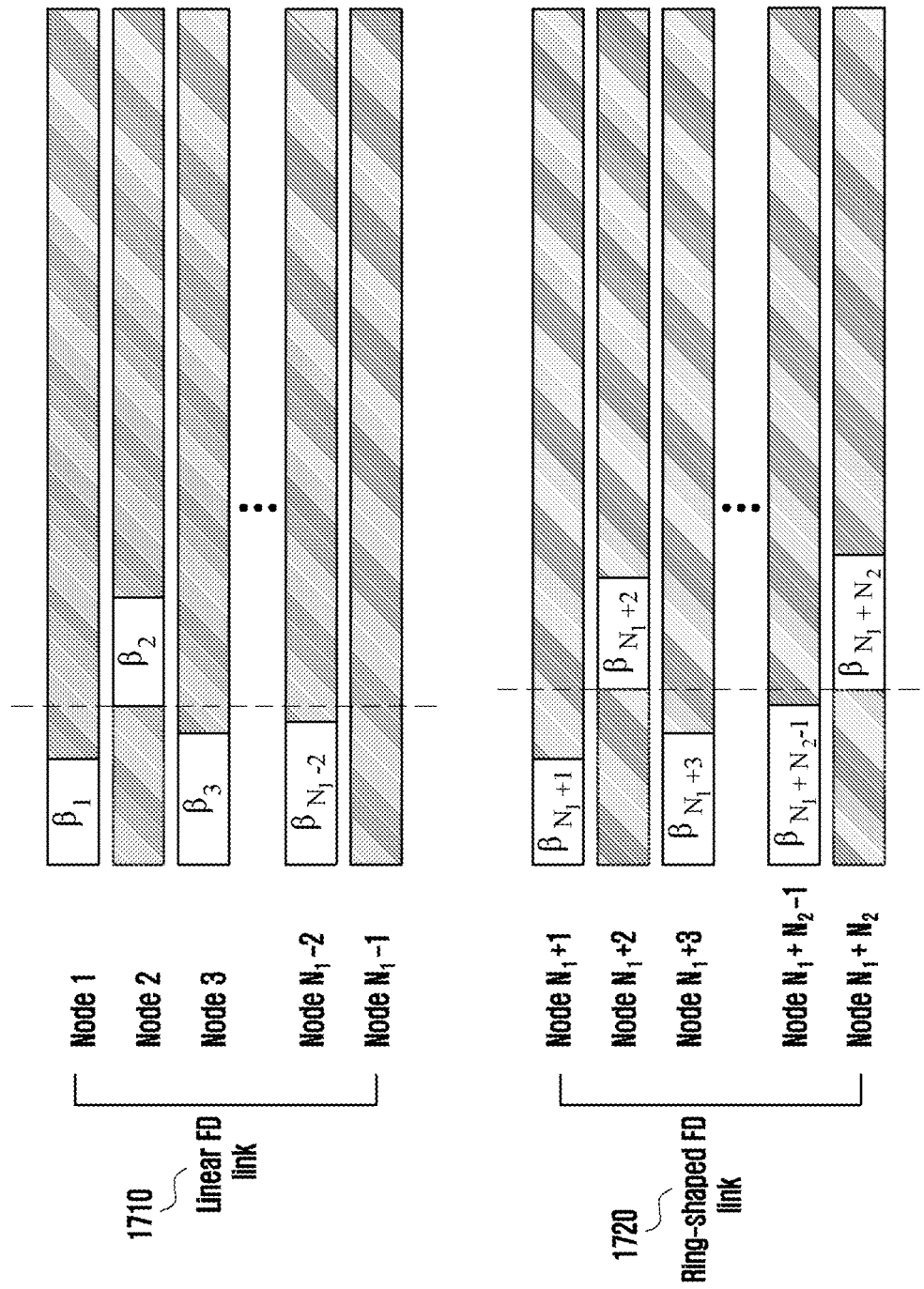
FIG. 17 illustrates a transmission frame scheduled for a scenario of a multi-FD topology according to an embodiment of the present disclosure.

FIG. 17 illustrates a transmission frame scheduled for a scenario of a multi-FD topology according to an embodiment of the present disclosure.

Referring to FIG. 17, a transmission frame 1710 scheduled for a linear FD topology object 1610 including $N_1$ communication entities may be determined by applying an algorithm in Table 1 or Table 2, regardless of existence of a ring-shaped FD topology object 1620. A transmission frame 1720 scheduled for the ring-shaped FD topology object 1620 including $N_2$ communication entities may be determined by applying an algorithm in Table 3 or Table 4, regardless of existence of the linear FD topology object 1610.

1.6. A Communication Protocol in an FD Mesh Network

Hereinafter, a communication protocol for supporting FD scheduling in a mesh network is described. Description of a method for supporting FD scheduling by a base station may be made according to two divided cases: a case in which the base station receives information required for transmission frame scheduling from a terminal; and a case in which the base station receives no information.

Figure 18:
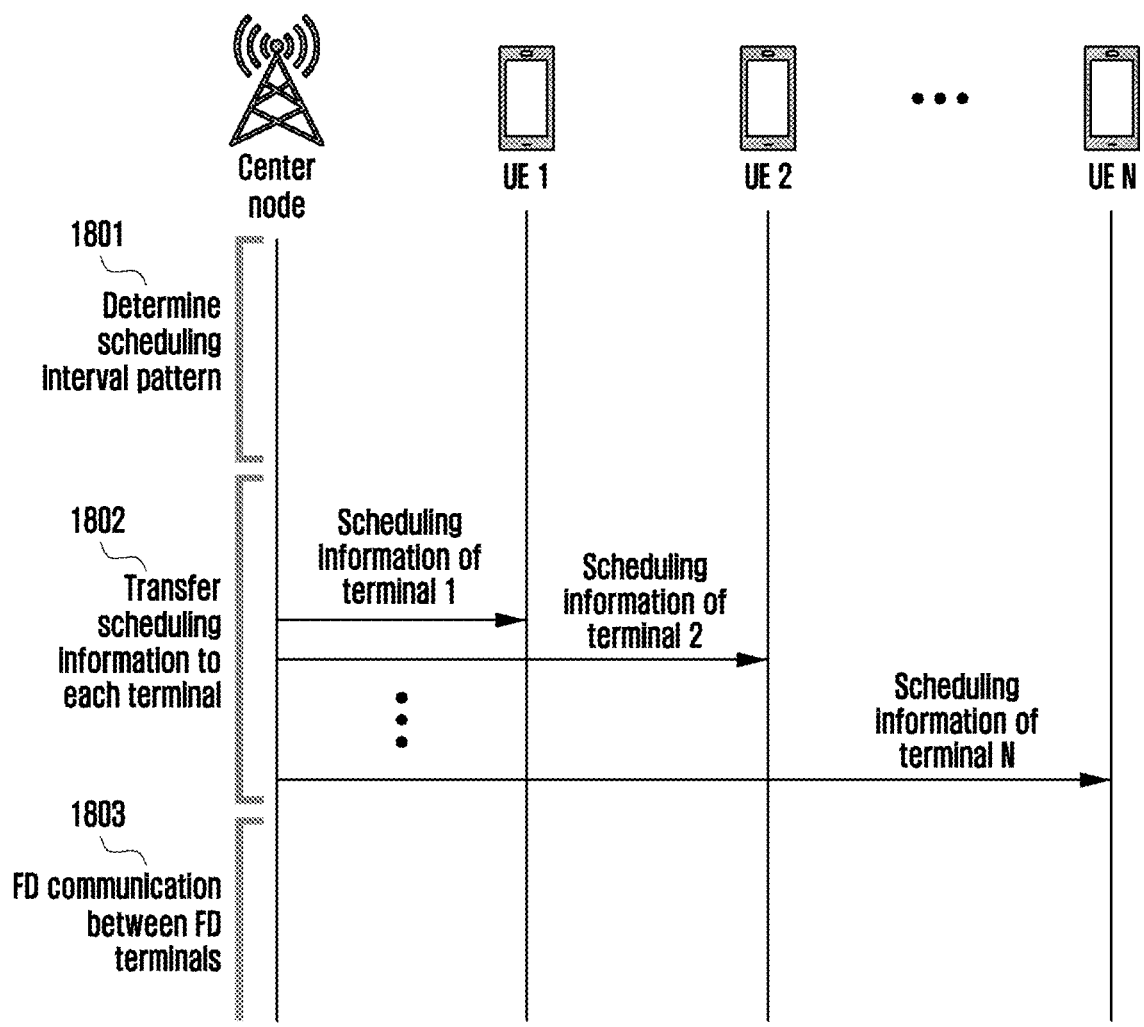
FIG. 18 illustrates a communication protocol according to an embodiment of the present disclosure.

FIG. 18 illustrates a communication protocol in a case in which a base station autonomously schedules a transmission frame of terminals participating FD communication without receiving communication environment information from a terminal.

Referring to FIG. 18, a scheduling procedure of the base station is as follows:

(1) Operation 1801: A base station determines a scheduling interval pattern and a yield interval length of each terminal, (2) Operation 1802: The base station transfers scheduling information to each terminal, and/or (3) Operation 1803: Terminals perform FD communication.

In operation 1801, the base station may use a constant value to which a margin is applied with the length of the yield interval of each terminal, and may use a predefined pattern as the scheduling interval pattern. In this case, the constant value to which the margin is applied may be a value acquired through Equation 1 and stored, or a value generated according thereto. In addition, the predefined pattern may be a pattern predetermined according to the number of terminals to be scheduled by the base station, and may be a pattern determined according to a pattern determination algorithm of the disclosure. When the base station receives no communication environment information from the terminal, the base station cannot identify an environment of interference between terminals during FD communication, and thus, the length of the yield interval of each terminal cannot be optimized.

In operation 1802, the base station may transmit scheduling information determined for each terminal.

In operation 1803, each terminal having received the scheduling information from the base station may perform FD communication according to the received scheduling information.

Figure 19:
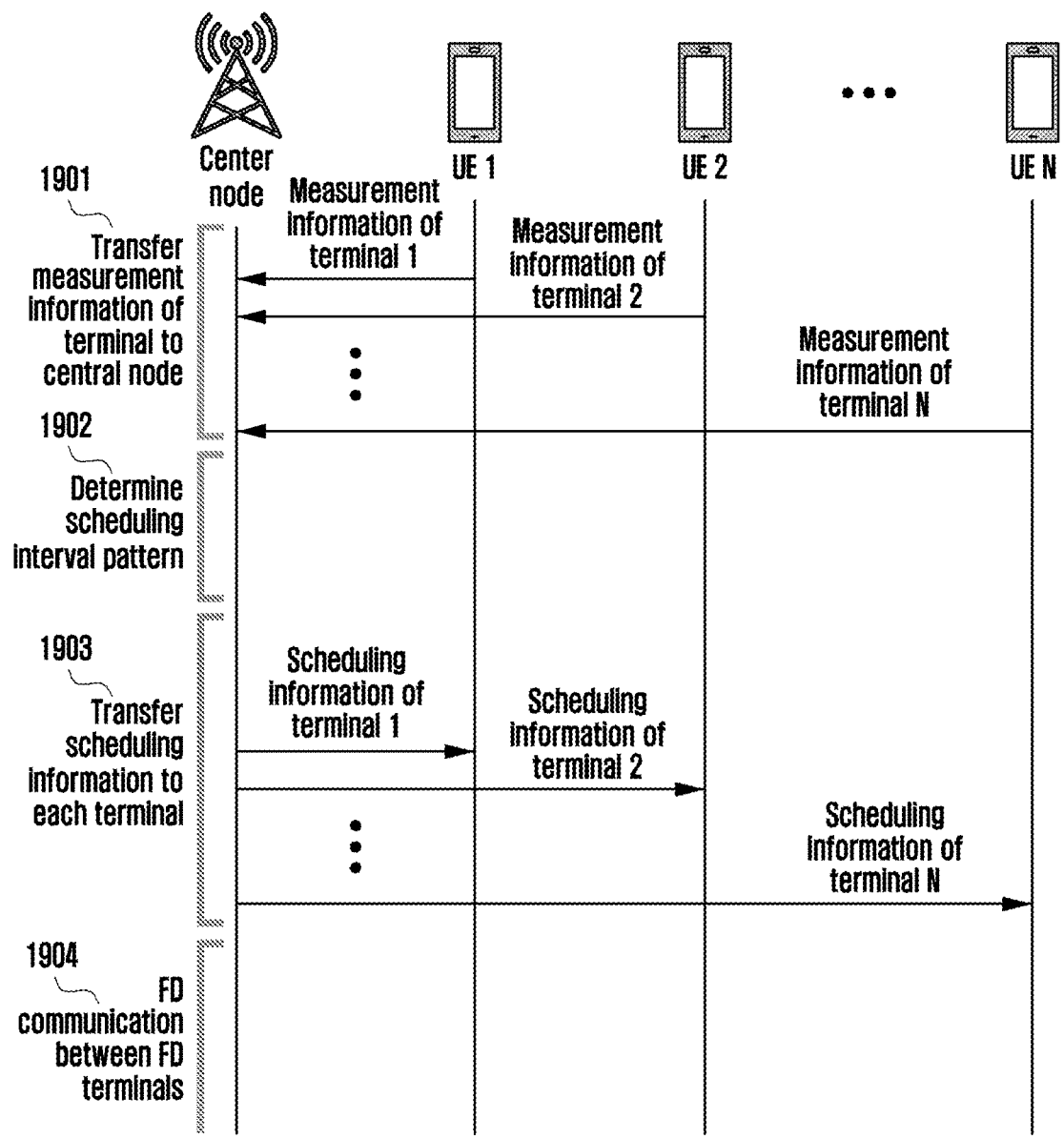
FIG. 19 illustrates a communication protocol according to an embodiment of the present disclosure.

FIG. 19 illustrates a communication protocol in a case in which a base station receives communication environment information from a terminal to perform scheduling of a transmission frame of terminals participating FD communication.

Referring to FIG. 19, a scheduling procedure of the base station is as follows:

(1) Operation 1901: Each terminal transfers terminal measurement information for scheduling to a base station, (2) Operation 1902: The base station determines a scheduling interval pattern and a yield interval length of each terminal, (3) Operation 1903: The base station transfers scheduling information to each terminal, and/or (4) Operation 1904: Terminals perform FD communication.

In this case, operations 1901 to 1903 may be included in the topology structure determination procedure described in section 1.1 above in the specification.

In operation 1901, each terminal may transmit information on a source-destination relationship between terminals, external interference power, SI power, and desired signal power to the base station.

In operation 1902, the base station may determine the position and the length of a yield interval of each terminal in consideration of the received communication environment information such as a situation of interference between terminals. In this case, the length of the yield interval may be determined according to Equation 1 or modification thereof.

In operation 1903, the base station may transmit the determined scheduling information to each terminal.

In operation 1904, each terminal may perform FD communication according to the received scheduling information.

The protocol illustrated in FIG. 19 may be repeatedly performed at a regular interval to maintain SI channel estimation performance of each terminal even under the time-variance of the communication environment.

2. A Scheduling Method in an FD Cellular Network

Next, a scheduling method in an FD cellular network will be described according to an embodiment of the disclosure.

In the cellular network, it is assumed that a base station performs scheduling and also participates in FD communication. Accordingly, there is an exception to a rule of determining a scheduling pattern so that a base station transmits a signal at high power. In addition, unlike the mesh network, different channels are allocated to FD topologies existing in a network from the base station so as to allow performing FD communication.

A procedure of determining a communication topology structure in an FD cellular network may be identical to the procedure of determining a communication topology structure in the mesh network in section 1.1 above.

2.1. A Procedure of Determining a Scheduling Pattern in a Case of a Linear FD Topology In a case of the linear FD topology as shown in 610 of FIG. 6, a yield interval may be configured for each terminal with avoidance of an interval (i.e., a yield interval of a terminal for transmitting a desired signal) in which a desired signal that each terminal is to receive is transmitted at low power. As described above, a yield interval of a specific terminal may be allocated only when a terminal receiving a signal transmitted by a specific terminal performs FD communication. Hereinafter, in the disclosure, for convenience of description, it is assumed that there is an index value in the terminal. For example, when a terminal having a terminal index "i" corresponds to a terminal performing FD communication, the terminal may receive a signal from a terminal having a terminal index "i−1," and simultaneously, may transmit a signal to a terminal having a terminal index "i+1." In addition, terminals having different terminal indices may have different topologies or may be terminals in different chains when a topology has a multicast structure. For convenience of description, when a terminal has a terminal index "i," the terminal may be called an "i-th terminal" or "terminal i," and in the disclosure, the "i-th terminal" or the "terminal i" means a terminal having a terminal index "i."

Unlike the mesh network, the base station transmits a signal at higher power compared to power at which terminals around the base station transmit signals, and thus, even though the transmission signal of the base station does not correspond to a desired signal, interference in SI channel estimation of the terminals therearound may occur. Accordingly, transmission may be performed at low power at all intervals in which terminals perform SI channel estimation. An algorithm of determining a scheduling pattern according to an embodiment of the disclosure in consideration of the description above may be as shown in Table 5 below.

TABLE 5

Parameters: number of topologies existing in topology object (N)
Output: scheduled transmission frame
begin
  i ← 1
  while scheduling do
    if i = k
      terminal i transmits signal to base station
    if i = 1
      allocate yield interval to terminal i at foremost position in transmission frame
    else if i = N − 1
      allocate no yield interval to terminal i
    else if i = N
      allocate no yield interval to terminal i
    else if i = k
      allocate yield interval to terminal i so as not to overlap yield interval of base station
    else
      allocate yield interval to terminal i so as not to overlap yield TABLE 5-continued interval of terminal i − 1
      base station allocates yield intervals to all intervals used for SI channel estimation by terminals existing in topology
    i ← i + 1
  end
end In other words, in allocating a yield interval for each terminal and a base station according to an embodiment of the disclosure, when there are N terminals in a topology, the base station may allocate a yield interval at the foremost position of a transmission frame of terminal 1, may not allocate a yield interval to a terminal having a terminal index N−1 or N, and for terminals remaining after excluding a terminal transmitting a signal to the base station, may allocate yield intervals so that the yield intervals of terminals having neighboring indices do not overlap with each other. Thereafter, the base station may configure an interval obtained by summating yields intervals of all the terminals remaining after excluding the terminal transmitting a signal to the base station, as a yield interval of the base station itself, and may configure a yield interval of the terminal transmitting a signal to the base station so that the yield interval of the terminal transmitting a signal does not overlap with the yield interval of the base station itself. An algorithm for Table 5 above may also be implemented as shown in Table 6 below:

TABLE 6

Parameters:  frame symbol index set: [1, M]
                number of terminals existing in topology object: N
                $β_i$: length of yield interval of i-th terminal
                Di: frame symbol index set of yield interval of i-th terminal
                k: index of terminal for transmitting signal to base station
Output:      position of yield interval of each terminal in transmission frame
begin:
  $D_i = \emptyset \; \forall i$
  i ← 1
  while i ≤ N
    if i = 1
      determine $D_i$ such that $D_i \subset [1, M]$ & $|D_i| = β_i$
    elseif i = k + 1
      determine $D_i$ such that $D_i \subset [1, M]$ & $|D_i| = β_i$
    elseif i ≤ N − 2 & i ≠ k
      determine $D_i$ such that $D_i \subset [1, M]$ & $D_{i−1} \cap D_i = \emptyset$ & $|D_i| = β_i$
    i ← i + 1
  end determine $D_{BS}$ such that $D_{BS} = U_{j=1, j \neq k}^{N} D_j$ determine $D_k$ such that $D_k \subset [1, M]$ & $D_k \cap D_{BS} = \emptyset$ & $|D_k| = β_k$
end In Table 6, $\phi$ indicates a null set. As an example of a scheduling pattern, a minimum index condition may be added in an operation of determining yield interval $D_i$ of terminal 1. In this case, a yield interval is positioned at the foremost position of a transmission frame, and thus SI channel estimation can be performed at the earliest time, whereby a transmission rate within a transmission interval can be increased.

Figure 20:
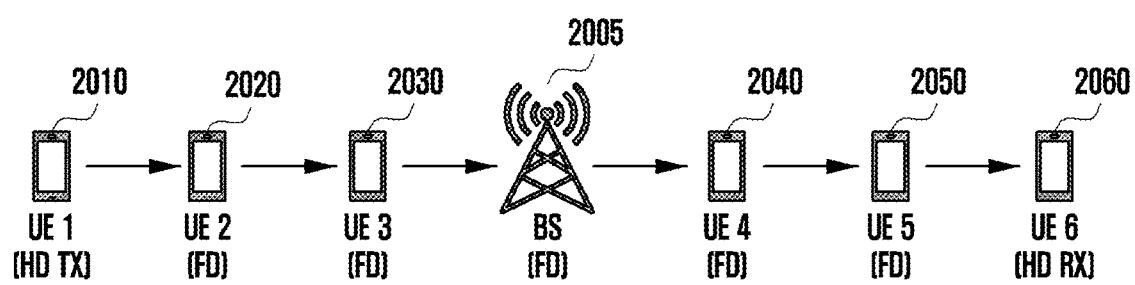
FIG. 20 illustrates a scenario of a linear FD topology in an FD cellular network according to an embodiment of the present disclosure.

FIG. 20 illustrates a scenario of a linear FD topology in an FD cellular network according to an embodiment of the present disclosure. Scheduling according to an embodiment of the present disclosure for this scenario may be determined as shown in FIGS. 21 and 22.

Figure 21:
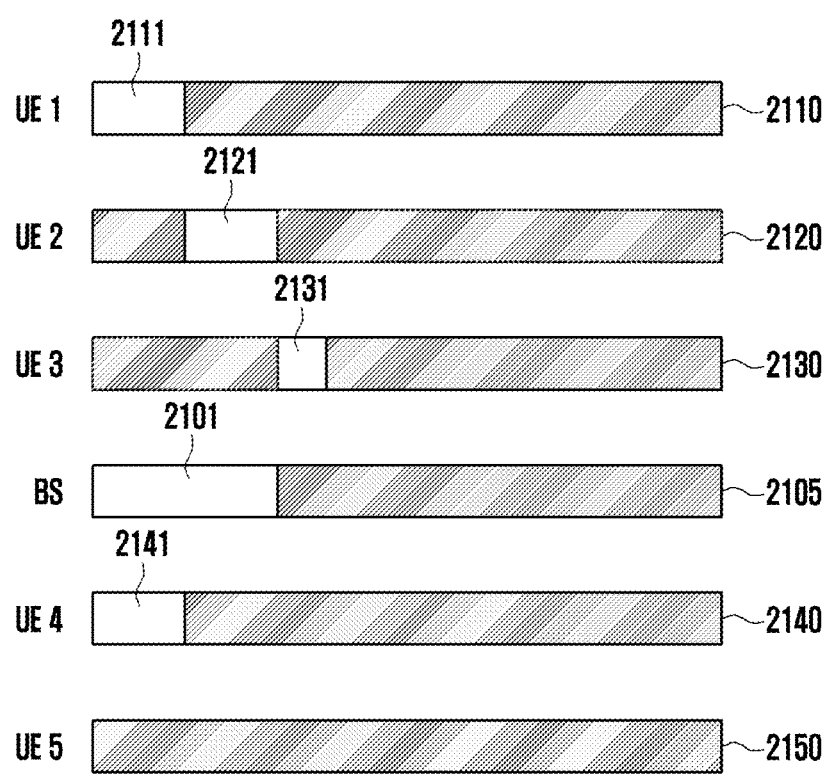
FIG. 21 illustrates a transmission frame scheduled for a scenario of a linear FD topology in an FD cellular network according to an embodiment of the present disclosure.
Figure 22:
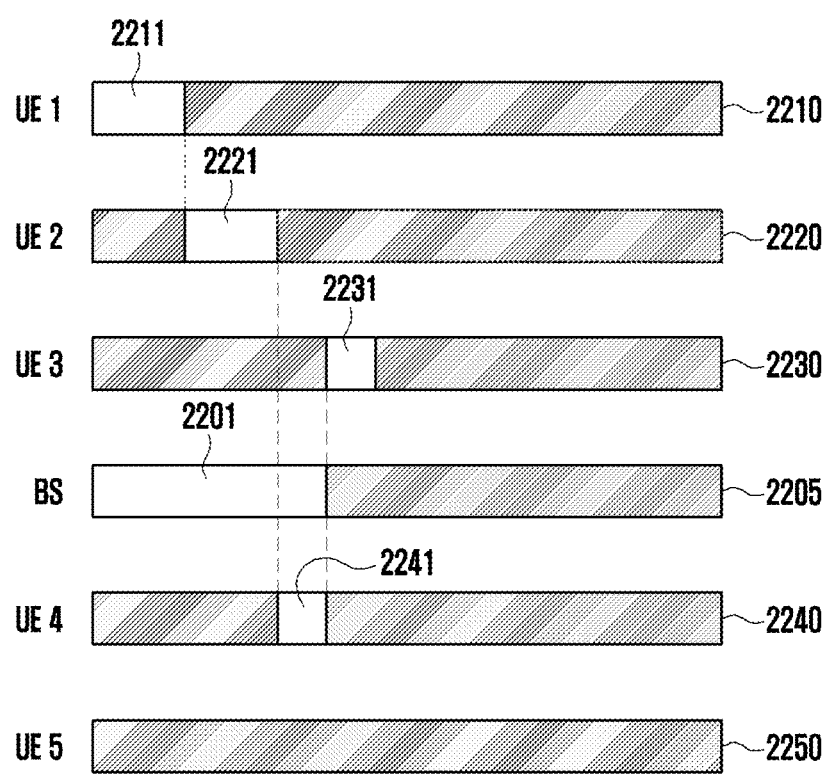
FIG. 22 illustrates a transmission frame scheduled for a scenario of a linear FD topology in an FD cellular network according to an embodiment of the present disclosure.

FIG. 21 illustrates a transmission frame scheduled for a scenario of a linear FD topology in an FD cellular network according to an embodiment of the present disclosure, and FIG. 22 illustrates a transmission frame scheduled for a scenario of a linear FD topology in an FD cellular network according to an embodiment of the present disclosure.

In another example, when the minimum index condition and $U_{j=1}^{i-1}(D_j \cap D_i)=\phi$ are added to a $D_i$ determination condition, yield intervals of respective terminals may be scheduled to be allocated at the foremost position in the transmission frame while not overlapping with each other as shown in an example in FIG. 22. Through this scheduling pattern determination method, one scheduling interval pattern as shown in FIG. 22 may be acquired even though the number of terminals in the topology and the length of the yield interval of each terminal have any value.

2.2. A Method for Determining a Scheduling Pattern in a Case of a Ring-Shaped FD Topology In a ring-shaped structure scheduling pattern determination method as shown in 620 on FIG. 6, for each terminal, a base station may determine a yield interval for each terminal with avoidance of a yield interval of the previous terminal. In addition, in the ring-shaped structure scheduling pattern determination method, not only the position of a yield interval of the previous terminal but also the position of a yield interval of the next terminal may be considered. That is, when a terminal having the largest terminal index transmits a signal to terminal 1, a yield interval of the last terminal may not overlap a yield interval of terminal 1 to perform SI channel estimation of terminal 1.

An algorithm of determining a scheduling pattern for the ring-shaped FD topology according to an embodiment of the disclosure may be as shown in Table 7 below.

TABLE 7

Parameters: number of topologies existing in topology object (N)
Output: scheduled transmission frame
begin
 i ← 1
 while scheduling do
  if i = k
   terminal i transmits signal to base station
  if i = 1
   allocate yield interval to terminal i at foremost position in
transmission frame
  else if i = N
   allocate yield interval to terminal i such that yield interval
of terminal i − 1 and yield interval of terminal 1 do not overlap
with each other
  else if i = k
   allocate yield interval to terminal i so as not to overlap yield
interval of base station
  else
   allocate yield interval to terminal i so as not to overlap yield
interval of terminal i − 1
    base station allocates yield intervals to all intervals used for SI
channel estimation by terminals existing in topology
   i ← i + 1
  end
end In other words, in allocating a yield interval for each terminal and a base station according to an embodiment of the disclosure, when there are N terminals in a topology, the base station may allocate a yield interval at the foremost position of a transmission frame of terminal 1, may allocate a yield interval to the N-th terminal so that the yield interval of the N-th terminal does not overlap with the yield intervals of the (N−1)-th terminal and terminal 1, and for terminals remaining after excluding a terminal transmitting a signal to the base station, may allocate yield intervals so that the yield intervals of terminals having neighboring indices do not overlap with each other. Thereafter, the base station may configure an interval obtained by summating yields intervals of all the terminals remaining after excluding the terminal transmitting a signal to the base station, as a yield interval of the base station itself, and may configure a yield interval of the terminal transmitting a signal to the base station so that the yield interval of the terminal transmitting a signal does not overlap with the yield interval of the base station itself. An algorithm for Table 7 above may also be implemented as shown in Table 8 below:

TABLE 8

Parameters: frame symbol index set: [1, M]
    number of terminals exisiting in topology object: N
    $\beta_i$: length of yield interval of i-th terminal
    Di: frame symbol index set of yield interval of i-th terminal
    k: index of terminal for transmitting signal to base station
Output: position of yield interval of each terminal in
transmission frame
begin
 $D_i = \emptyset \; \forall i$
 i ← 1
 while i ≤ N
  if i = 1
   determine $D_i$ such that $D_i \subset [1, M]$ & $|D_i| = \beta_i$
  elseif i = k + 1
   determine $D_i$ such that $D_i \subset [1, M]$ & $|D_i| = \beta_i$
  elseif i ≤ N − 1 & i ≠ k
   determine $D_i$ such that $D_i \subset [1, M]$ & $D_{i-1} \cap D_i = \emptyset$ & $|D_i| = \beta_i$
  elseif i = N
   determine $D_i$ such that $D_i \subset [1, M]$ & $D_{i-1} \cap D_i = \emptyset$ & $D_i \cap D_1 = \emptyset$ & $|D_i| = \beta_i$
  i ← i + 1
 end determine $D_{BS}$ such that $D_{BS} = U_{\substack{j=1 \\ j \neq k}}^{N} D_j$ determine $D_k$ such that $D_k \subset [1, M]$ & $D_k \cap D_{BS} = \emptyset$ & $|D_k| = \beta_k$

| $\phi$ | | |
|---|---|---|
| | $D_i$ | 1 |

Figure 23:
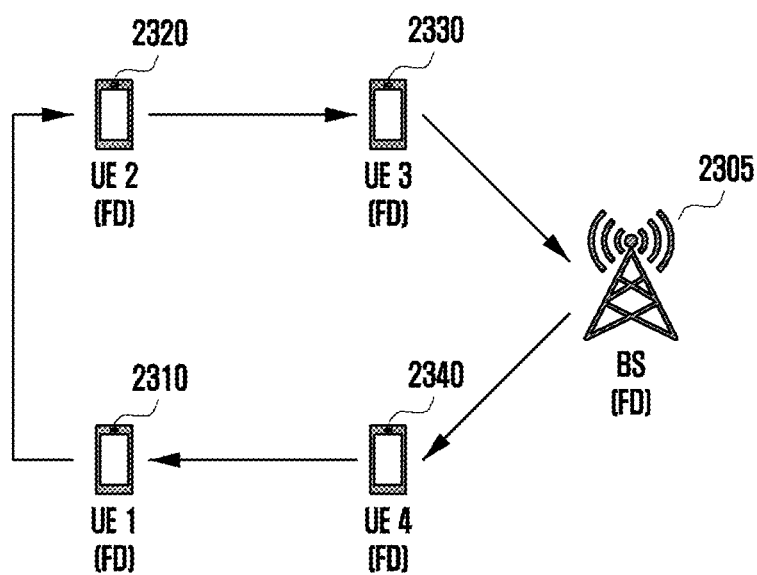
FIG. 23 illustrates a scenario of a ring-shaped FD topology in an FD cellular network according to an embodiment of the present disclosure.

FIG. 23 illustrates a scenario of a ring-shaped FD topology in an FD cellular network according to an embodiment of the present disclosure.

In the scenario of FIG. 23, the number of terminals in a topology object is four, and all of the terminals and the base station perform FD communication, and thus, transmission frames and yield intervals may be configured for all of the terminals and the base station. Scheduling according to an embodiment of the disclosure for this scenario may be determined as shown in FIGS. 24 and 25.

Figure 24:
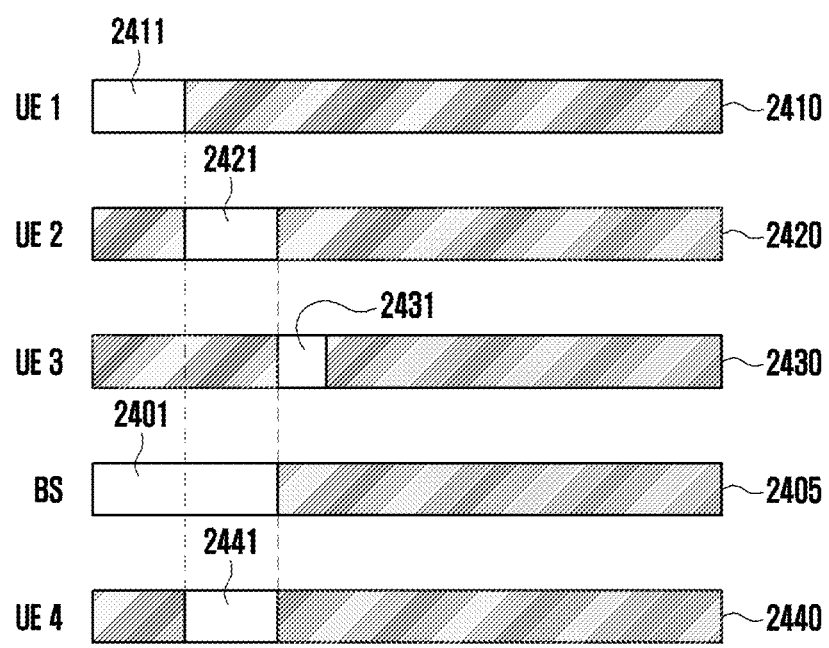
FIG. 24 illustrates a transmission frame scheduled for a scenario of a ring-shaped FD topology in an FD cellular network according to an embodiment of the present disclosure.
Figure 25:
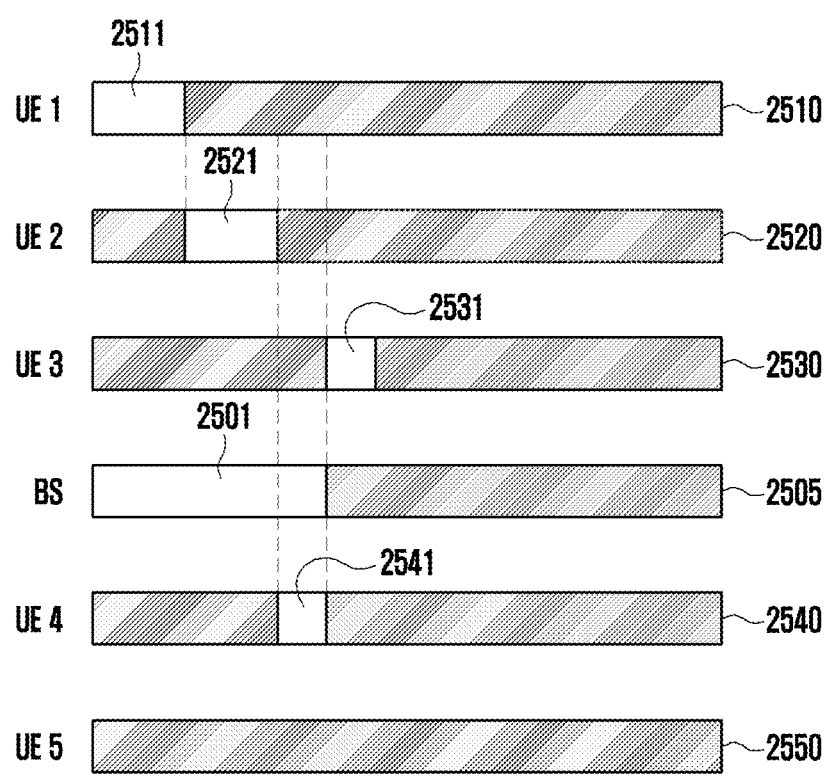
FIG. 25 illustrates a transmission frame scheduled for a scenario of a ring-shaped FD topology in an FD cellular network according to an embodiment of the present disclosure.

FIG. 24 illustrates a transmission frame scheduled for a scenario of a ring-shaped FD topology in an FD cellular network according to an embodiment of the present disclosure, and FIG. 25 illustrates a transmission frame scheduled for a scenario of a ring-shaped FD topology in an FD cellular network according to an embodiment of the disclosure.

In another example, when the minimum index condition and $U_{j=1}^{i-1}(D_j \cap D_i)=\phi$ are added to a $D_i$ determination condition, all yield intervals of respective terminals may be scheduled to be allocated at the foremost position in the transmission frame while not overlapping with each other as shown in an example in FIG. 25. Through this scheduling pattern determination method, one scheduling interval pattern as shown in FIG. 25 may be acquired even though the number of terminals in the topology and the length of the yield interval of each terminal have any value.

2.3. Scheduling in Consideration of Multicast in a Communication Topology (for Q-Shaped and Y-Shaped Topologies)

Multicast in FD communication defined in the disclosure means simultaneously performing signal transmission and reception in the same frequency band by a communication device which transmits a signal to multiple terminals. In this case, the interference between terminals in a topology may be very low in order to perform FD communication. As described above, in comparison with the linear FD topology and the ring-shaped FD topology, which are unicast topologies, a Y-shaped FD topology and a Q-shaped FD topology, which are multicast topologies, have structures obtained by adding linear FD topologies to the linear FD topology and the ring-shaped FD topology. Accordingly, the multicast may be considered as a structure obtained by adding a multicast chain (additional reception terminal) to a unicast chain (linear or ring-shaped FD topology).

In the multicast FD topology scheduling method according to an embodiment of the disclosure, a base station may schedule a unicast chain first, and then schedule a multicast chain. In this case, a scheduling pattern of terminals corresponding to the unicast chain may be identical to a scheduling pattern in a case of considering unicast only. In a case of the multicast chain, the first terminal in the multicast chain is included in the unicast chain and the position of a yield interval is already determined, and thus, the remaining terminals in the multicast chain may use a method for allocating a yield interval with avoidance of a yield interval of a desired signal in the same manner as the algorithm used in the unicast.

Figure 26:
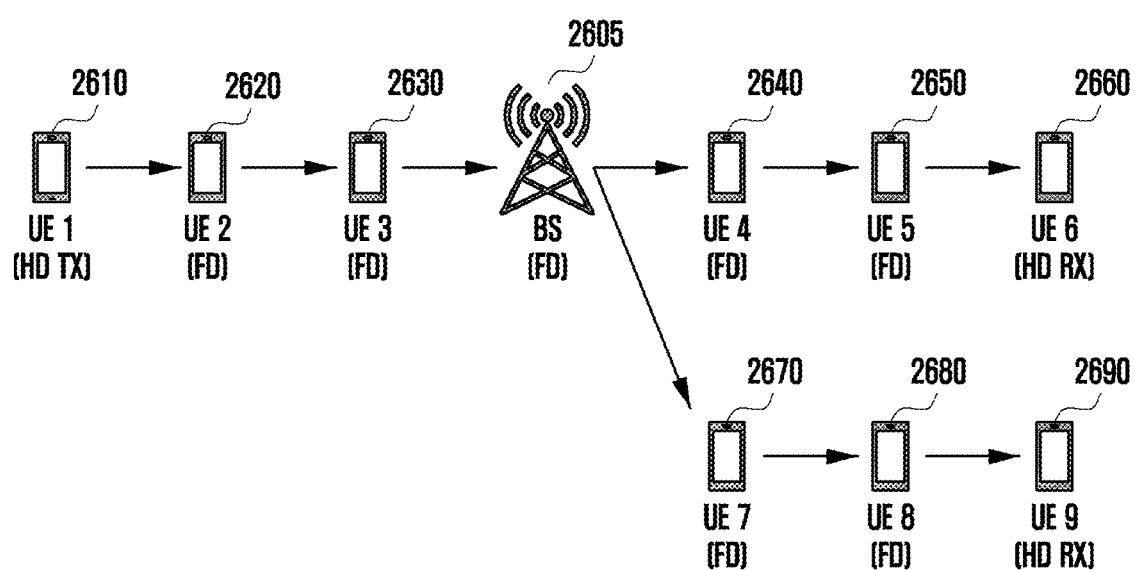
FIG. 26 illustrates a scenario of a multicast topology (Y-shaped FD topology) in an FD cellular network according to an embodiment of the present disclosure.

FIG. 26 illustrates a scenario of a multicast topology (Y-shaped FD topology) in an FD cellular network according to an embodiment of the present disclosure.

Referring to FIG. 26, it may be understood that each of terminals 1 to 6 2610, 2620, 2630, 2640, 2650, and 2660 corresponds to a unicast chain, and each of terminals 7 to 9 2670, 2680, and 2690 corresponds to a multicast chain added to the unicast chain. Scheduling for this scenario according to an embodiment of the disclosure may be determined as shown in FIG. 27.

Figure 27:
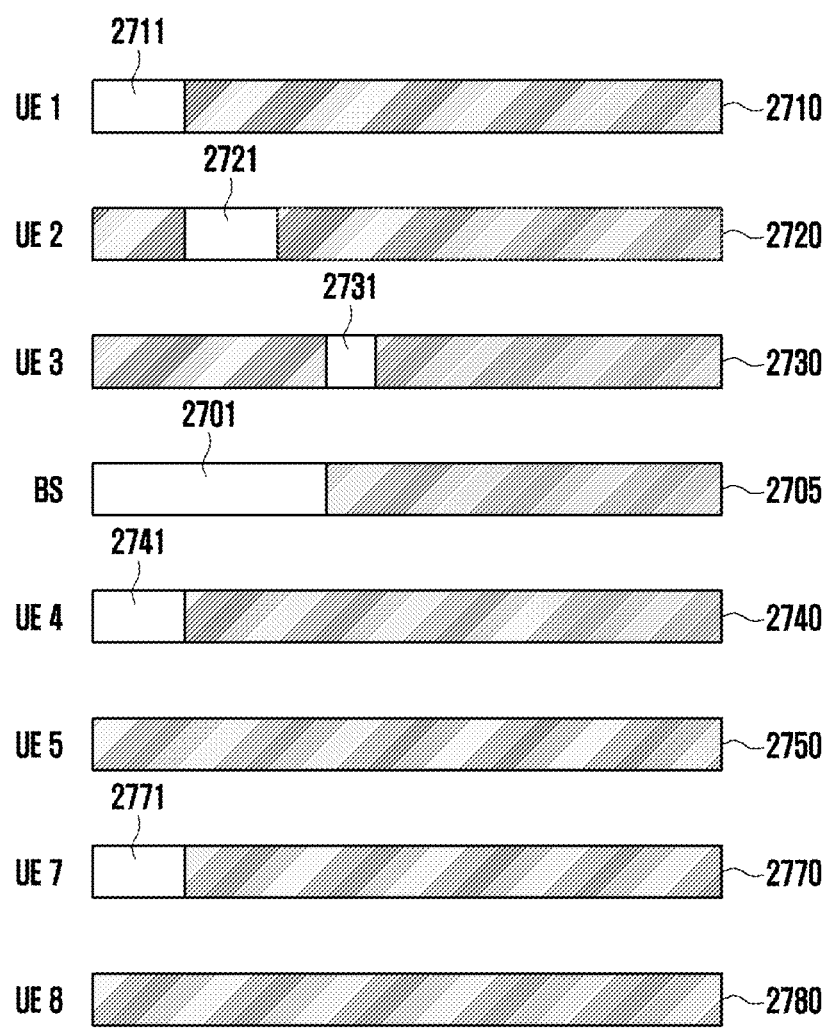
FIG. 27 illustrates a transmission frame scheduled for a scenario of a multicast topology in an FD cellular network according to an embodiment of the present disclosure.

FIG. 27 illustrates a transmission frame scheduled for a scenario of a multicast topology in an FD cellular network according to an embodiment of the disclosure.

Referring to FIG. 27, terminals 1, 2, and 4 2610, 2620, and 2640 correspond to transmission frames 2710, 2720, and 2740 in a case of N=6 according to an algorithm in Table 5 or Table 6, and yield intervals 2711, 2721, and 2741 are configured while not overlapping with each other in the corresponding earlier positions. A base station 2605 configures a yield interval 2701 having the length corresponding to a sum of yield intervals of terminals 1, 2, and 4, and a yield interval 2731 of terminal 3 is configured so as not to overlap with the yield interval 2701 of the base station. Terminal 6 2660 performs HD reception communication, and thus, there is no need to configure a yield interval 2750 for terminal 5 2650, and no transmission resource is allocated to terminal 6 2660. Likewise, for the multicast chain, an algorithm in a case of N=4 in Table 5 or Table 6 is applied, wherein a yield interval 2701 is already configured for the base station corresponding to the first index terminal, and thus, terminal 7 is considered as the first terminal, and a yield interval may be configured for the remaining terminals. In other words, in the transmission frame 2770 of terminal 7 2670, a yield interval 2771 may be configured at the foremost position in the transmission frame by overlapping the base station since terminal 7 2670 does not corresponds to a terminal transmitting a signal to the base station. Terminal 9 2690 performs HD reception communication, and thus, there is no need to configure a yield interval for terminal 8 2680, and no transmission resource is allocated to terminal 9 2690.

2.4. A Scheduling Method for a Multi-FD Topology

An embodiment according to the disclosure may be extended to a multi-FD topology environment. The multi-FD topology environment corresponds to a communication environment in which two or more FD communication topology objects exist in the same network.

Each of the FD topologies existing in the cellular network environment has a unique channel allocated thereto, and thus, the FD topologies do not interfere with each other. Accordingly, in the cellular network environment, the base station may independently schedule a transmission frame for each topology.

Figure 28:
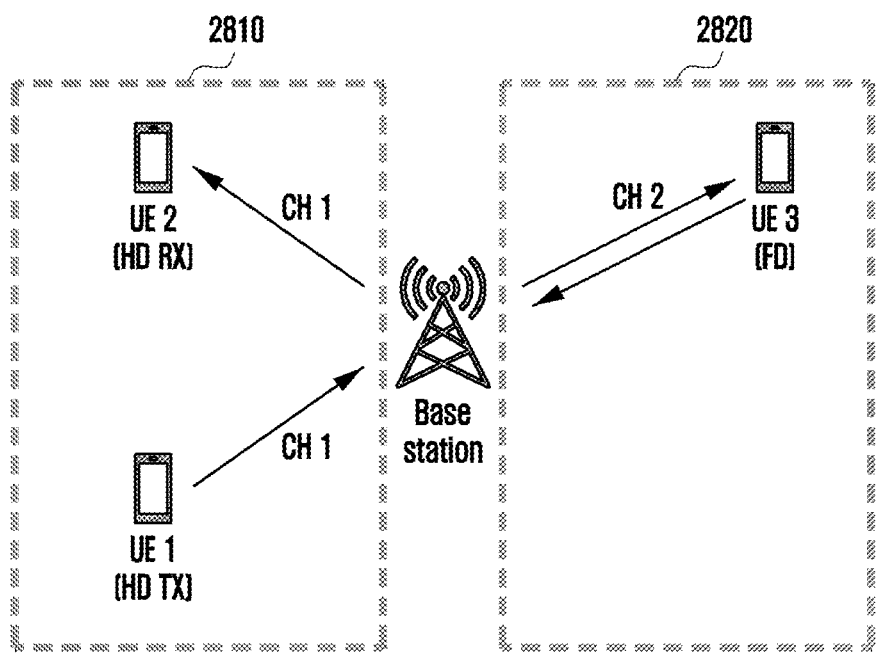
FIG. 28 illustrates an example of a multi-FD topology in which a linear FD topology and a ring-shaped FD topology share one base station and are simultaneously exist according to an embodiment of the present disclosure.

FIG. 28 illustrates an example of a multi-FD topology in which a linear FD topology 2810 and a ring-shaped FD topology 2820 share one base station and are simultaneously exist, and to which an embodiment of the disclosure is applied. Scheduling according to an embodiment of the disclosure for the example in FIG. 28 may be determined as shown in FIG. 29.

Referring to FIG. 28, the linear FD topology 2810 and the ring-shaped FD topology 2820 shares one base station, and the topologies perform communication through different channels, channel 1 and channel 2, respectively. In this case, two topologies use different channels, and thus a scheduling result of one topology does not influence scheduling of the other topology. Accordingly, transmission frames of two different topology objects in the cellular network environment may be independently scheduled as shown in FIG. 29.

Figure 29:
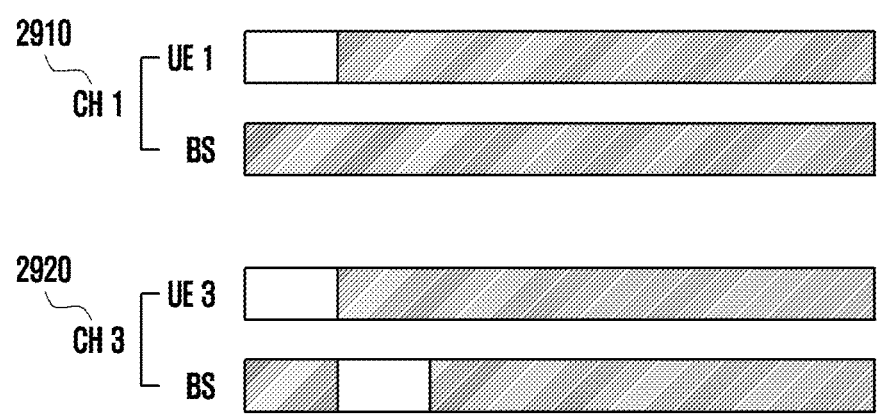
FIG. 29 illustrates a transmission frame scheduled for a scenario of a multi-FD topology according to an embodiment of the present disclosure.

FIG. 29 illustrates a transmission frame scheduled for a scenario of a multi-FD topology according to an embodiment of the present disclosure. The scenario in FIG. 29 is simplified as a model having a minimum number of communication entities included in each topology object, and may be extended to a model in which each topology object has a predetermined number of terminals as described above.

Referring to FIG. 29, a transmission frame 2910 scheduled for a linear FD topology object 2810 may be determined by applying an algorithm in Table 5 or Table 6, regardless of existence of a ring-shaped FD topology object 2820. A transmission frame 2920 scheduled for the ring-shaped FD topology object 2820 may be determined by applying an algorithm in Table 7 or Table 8, regardless of existence of the linear FD topology object 2810.

2.5. A Communication Protocol in an FD Cellular Network

Hereinafter, a communication protocol for supporting FD scheduling in a cellular network is described. Description of a method for supporting FD scheduling by a base station may be made according to two divided cases: a case in which the base station receives information required for transmission frame scheduling from a terminal; and a case in which the base station receives no information.

Figure 30:
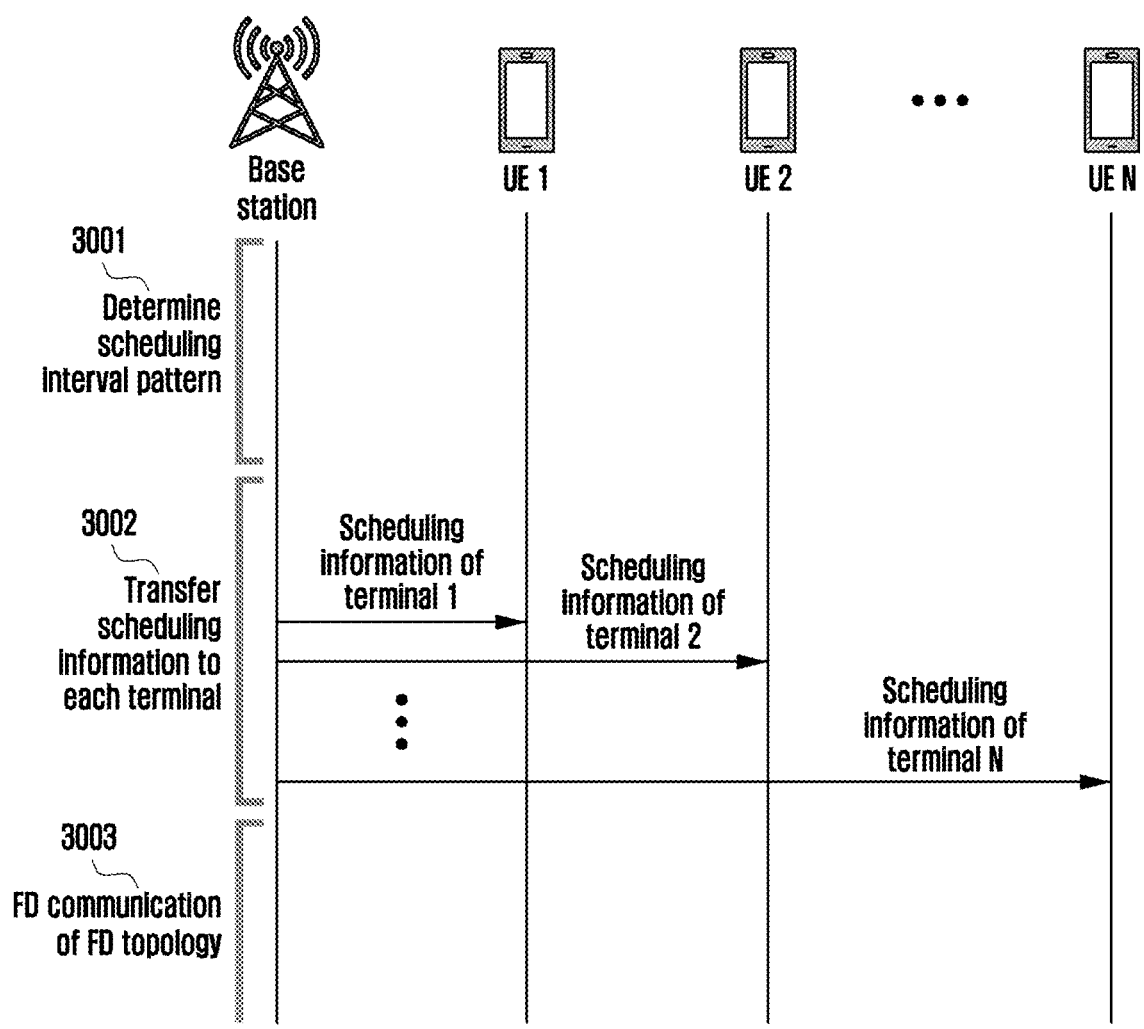
FIG. 30 illustrates a communication protocol according to an embodiment of the present disclosure.

FIG. 30 illustrates a communication protocol in a case in which a base station autonomously schedules a transmission frame of terminals participating FD communication without receiving communication environment information from a terminal.

Referring to FIG. 30, a scheduling procedure of the base station is as follows:

(1) Operation 3001: A base station determines a scheduling interval pattern and a yield interval length of each terminal, (2) Operation 3002: The base station transfers scheduling information to each terminal, and/or (3) Operation 3003: An FD topology performs FD communication.

In operation 3001, the base station may use a constant value to which a margin is applied with the length of the yield interval of each terminal, and may use a predefined pattern as the scheduling interval pattern. In this case, the constant value to which the margin is applied may be a value acquired through Equation 1 and stored, or a value generated according thereto. In addition, the predefined pattern may be a pattern predetermined according to the number of terminals to be scheduled by the base station, and may be a pattern determined according to a pattern determination algorithm of the disclosure. When the base station receives no communication environment information from the terminal, the base station cannot identify an environment of interference between terminals during FD communication, and thus, the length of the yield interval of each terminal cannot be optimized.

In operation 3002, the base station may transmit scheduling information determined for each terminal.

In operation 3003, the base station and each terminal having received the scheduling information from the base station may perform FD communication according to the determined scheduling information.

Figure 31:
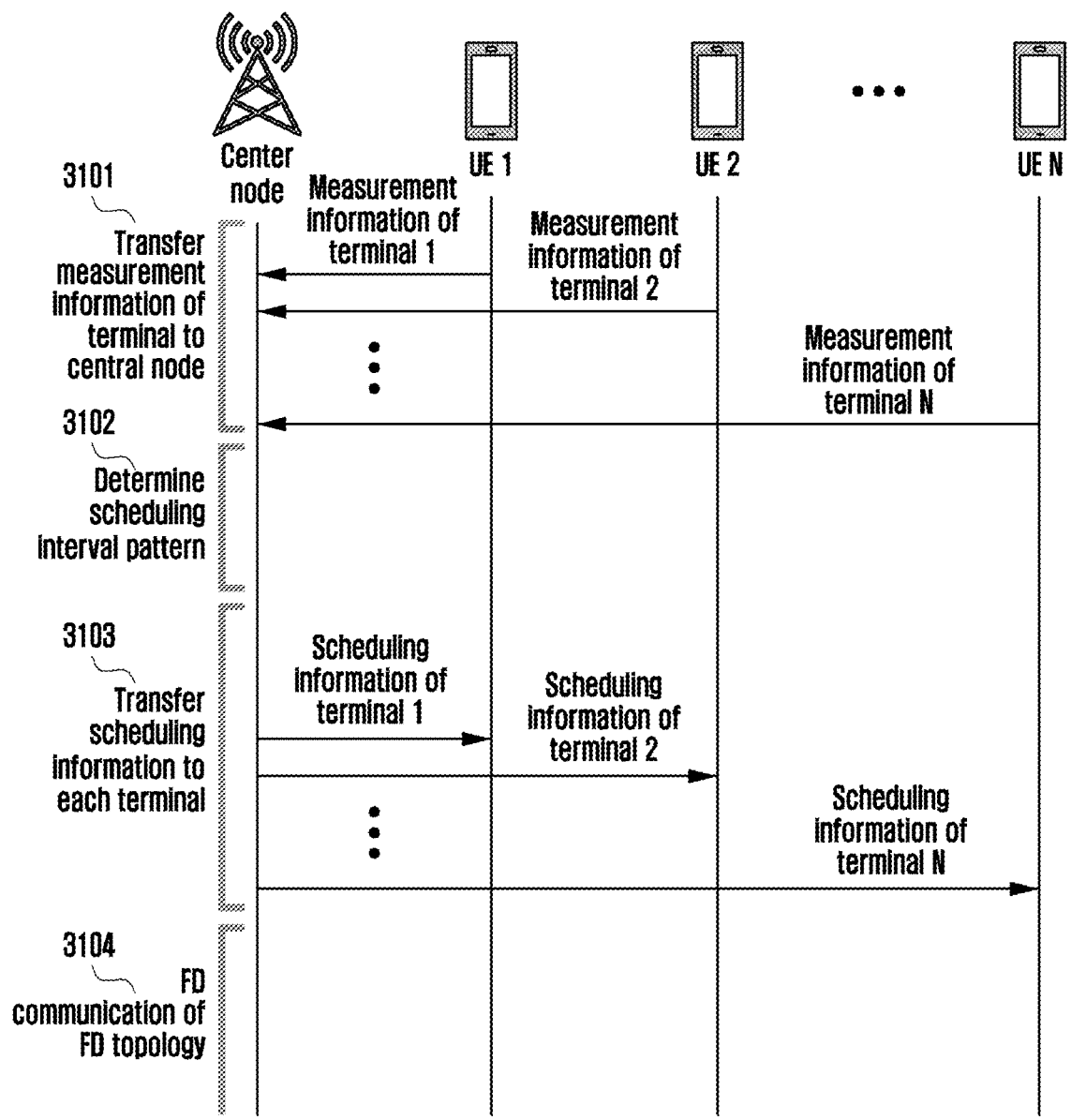
FIG. 31 illustrates a communication protocol according to an embodiment of the present disclosure.

FIG. 31 illustrates a communication protocol in a case in which a base station receives communication environment information from a terminal to perform scheduling of a transmission frame of terminals participating FD communication.

Referring to FIG. 31, a scheduling procedure of the base station is as follows:
(1) Operation 3101: Each terminal transfers terminal measurement information for scheduling to a base station,
(2) Operation 3102: The base station determines a scheduling interval pattern and a yield interval length of each terminal,
(3) Operation 3103: The base station transfers scheduling information to each terminal, and/or
(4) Operation 3104: An FD topology performs FD communication.

In this case, operations 3101 to 3103 may be included in the topology structure determination procedure described in section 1.1 above in the specification.

In operation 3101, each terminal may transmit information on a source-destination relationship between terminals, external interference power, SI power, and desired signal power to the base station.

In operation 3102, the base station may determine the position and the length of a yield interval of each terminal in consideration of the received communication environment information such as a situation of interference between terminals. In this case, the length of the yield interval may be determined according to Equation 1 or modification thereof.

In operation 3103, the base station may transmit the determined scheduling information to each terminal.

In operation 3104, the base station and each terminal may perform FD communication according to the scheduling information received from the terminal.

The protocol illustrated in FIG. 31 may be repeatedly performed at a regular interval to maintain SI channel estimation performance of each terminal even under the time-variance of the communication environment.

Figure 32:
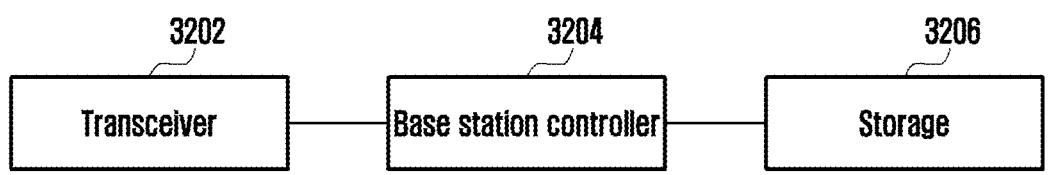
FIG. 32 illustrates a structure of a base station according to an embodiment of the present disclosure.

FIG. 32 illustrates a structure of a base station according to an embodiment of the disclosure. The term "base station" in the disclosure may be interchangeably used with a "central node".

Referring to FIG. 32, a base station may include a transceiver 3202, a base station controller 3204, and a storage 3206. In the disclosure, the base station controller may be defined as a circuit, an application-specific integrated circuit, or at least one processor.

The transceiver 3202 may transmit or receive a signal to or from another communication network entity. For example, the transceiver may transmit system information to a terminal, and may also transmit a synchronous signal, a reference signal, or a higher-layer signal.

The base station controller 3204 may control the overall operation of a base station according to an embodiment provided in the disclosure. For example, the base station controller may control operations provided in the disclosure to manage and reduce SI or interference between terminals. Specifically, the base station controller may determine a communication topology according to information stored or received from the terminal, and accordingly, may determine scheduling and a yield interval pattern which can minimize SI, and configure the same for the terminal.

The storage 3206 may store at least one of information transmitted or received through the transceiver 3204 and information generated through the base station controller.

Figure 33:
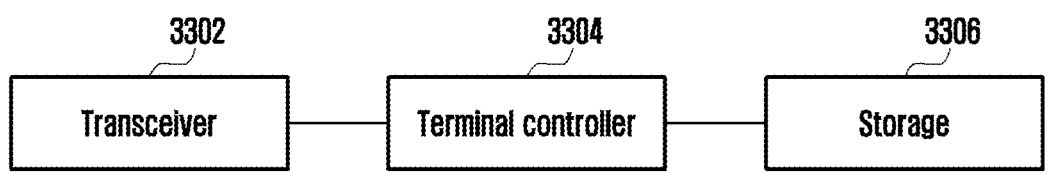
FIG. 33 illustrates a structure of a terminal according to an embodiment of the present disclosure.

FIG. 33 illustrates a structure of a terminal according to an embodiment of the disclosure. The term "terminal" in the disclosure may be interchangeably used with a "central node".

Referring to FIG. 33, a terminal may include a transceiver 3302, a terminal controller 3304, and a storage 3306. In the disclosure, the terminal controller may be defined as a circuit, an application-specific integrated circuit, or at least one processor.

The transceiver 3302 may transmit or receive a signal to or from another communication network entity. For example, the transceiver may receive system information from a base station, and may also receive a synchronous signal, a reference signal, or a higher-layer signal, and transmit a signal for providing environment information of the terminal to the base station.

The terminal controller 3304 may control the overall operation of a terminal according to an embodiment provided in the disclosure. For example, the terminal controller may control a signal flow between blocks to perform operations according to the flow chart and the drawings described above. Specifically, the terminal controller may operate upon a control signal from the base station to exchange a message or a signal with a communication device including a base station and/or another terminal.

The storage 3306 may store at least one of information transmitted or received through the transceiver and information generated through the terminal controller.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a central node in a full-duplex (FD) communication system, the method comprising:
   identifying a topology of a network supported by the central node and multiple nodes included in the topology of the network;
   determining a yield interval corresponding to each of the multiple nodes including a first node and a second node based on the identified topology of the network; and
   transmitting, to the multiple nodes, scheduling information based on the determined yield interval,
   wherein a first yield interval is an interval for the second node receiving, from the first node, a signal to estimate a self-interference channel, based on a signal transmission, of the first node of the multiple nodes, with a strength less than a threshold value, and
   wherein the first yield interval of the first node and a second yield interval of the second node do not overlap with each other.

2. The method of claim 1, wherein the yield interval corresponding to each of the multiple nodes is configured to be consecutive from a foremost position of a scheduled frame.

3. The method of claim 1, wherein a yield interval of the central node is configured based on a sum of yield intervals of nodes of multiple nodes excluding a node transmitting a signal to the central node and a yield interval of the node transmitting the signal to the central node does not overlap with the yield interval of the central node.

4. The method of claim 3, wherein the yield interval of the central node is configured from a foremost position of a scheduled frame, and
   wherein the yield interval of the node transmitting the signal to the central node and the yield interval of the central node are configured to be consecutive.

5. The method of claim 1, wherein a length of the yield interval is identified as a value of a predetermined constant.

6. The method of claim 1, further comprising receiving communication environment information from the multiple nodes,
   wherein a length and a position of the yield interval are determined based on the communication environment information.

7. The method of claim 6, wherein the communication environment information comprises at least one of information on a transmission device and a reception device for a Full-duplex (FD) communication of a second communication device, external interference power, self-interference power, or reception signal power.

8. The method of claim 1, wherein when the network comprises multiple topologies, scheduling information of the multiple nodes included in each of the multiple topologies is determined according to each of the multiple topologies.

9. The method of claim 1, wherein the central node corresponds to a base station, and each of the multiple nodes corresponds to a terminal or an integrated access and backhaul (IAB) node.

10. A central node in a full-duplex (FD) communication system, the central node comprising:
    a transceiver; and
    a controller operably connected to the transceiver, wherein the controller is configured to:
       identify a topology of a network supported by the central node and multiple nodes included in the topology of the network;
       determine a yield interval corresponding to each of the multiple nodes including a first node and a second node based on the identified topology of the network; and
       transmit, to the multiple nodes, scheduling information based on the determined yield interval,
    wherein a first yield interval is an interval for the second node receiving, from the first node, a signal to estimate a self-interference channel, based on a signal transmission, of the first node of the multiple nodes, with a strength less than a threshold value, and
    wherein the first yield interval of the first node and a second yield interval of the second node do not overlap with each other.

11. The central node of claim 10, wherein the yield interval corresponding to each of the multiple nodes is configured to be consecutive from a foremost position of a scheduled frame.

12. The central node of claim 10, wherein a yield interval of the central node is configured based on a sum of yield intervals of nodes of multiple nodes excluding a node transmitting a signal to the central node, and a yield interval of the node transmitting the signal to the central node does not overlap with the yield interval of the central node.

13. The central node of claim 12, wherein the yield interval of the central node is configured from a foremost position of a scheduled frame, and
    wherein the yield interval of the node transmitting the signal to the central node and the yield interval of the central node are configured to be consecutive.

14. The central node of claim 10, wherein a length of the yield interval is identified as a value of a predetermined constant.

15. The central node of claim 10, wherein the controller is further configured to receive communication environment information from the multiple nodes, and
    wherein a length and a position of the yield interval are determined based on the communication environment information.

16. The central node of claim 15, wherein the communication environment information comprises at least one of information on a transmission device and a reception device for a Full-duplex (FD) communication of a second communication device, external interference power, self-interference power, or reception signal power.

17. The central node of claim 10, wherein when the network comprises multiple topologies, scheduling information of the multiple nodes included in each of the multiple topologies is determined according to each of the multiple topologies.

18. The central node of claim 10, wherein the central node corresponds to a base station, and each of the multiple nodes corresponds to a terminal or an integrated access and backhaul (IAB) node.

* * * * *